United States Patent
Yamada et al.

(10) Patent No.: US 9,917,695 B2
(45) Date of Patent: Mar. 13, 2018

(54) AUTHENTICATED ENCRYPTION METHOD USING WORKING BLOCKS

(71) Applicants: BlackBerry Limited, Waterloo (CA); Certicom Corp., Mississauga (CA)

(72) Inventors: Atsushi Yamada, Etobicoke (CA); Gregory Marc Zaverucha, Redmond, WA (US)

(73) Assignees: BlackBerry Limited, Waterloo, Ontario (CA); Certicom Corp., Mississauga, Ontario (CA)

(*) Notice: Subject to any disclaimer, the term of this patent is extended or adjusted under 35 U.S.C. 154(b) by 265 days.

(21) Appl. No.: 13/793,810

(22) Filed: Mar. 11, 2013

(65) Prior Publication Data

US 2014/0146964 A1    May 29, 2014

Related U.S. Application Data

(60) Provisional application No. 61/731,304, filed on Nov. 29, 2012, provisional application No. 61/758,168, filed on Jan. 29, 2013.

(51) Int. Cl.
| | |
|---|---|
| *H04K 1/00* | (2006.01) |
| *H04L 9/28* | (2006.01) |
| *H04L 9/06* | (2006.01) |

(52) U.S. Cl.
CPC .............. *H04L 9/28* (2013.01); *H04L 9/0637* (2013.01); *H04L 9/0643* (2013.01); *H04L 2209/125* (2013.01)

(58) Field of Classification Search
CPC . H04L 9/06; H04L 9/28; H04L 9/0637; H04L 9/0643; H04L 2209/125
(Continued)

(56) References Cited

U.S. PATENT DOCUMENTS

2001/0033656 A1* 10/2001 Gligor ................... H04L 9/0637
380/28
2001/0046292 A1* 11/2001 Gligor ................... H04L 9/0662
380/37
(Continued)

OTHER PUBLICATIONS

Palash Sarkar, "Pseudo-Random Functions and Parallelizable Modes of Operations of a Block Cipher," IEEE Transactions on information Theory, vol. 56, No. 8, Aug. 2010, pp. 4025-4027.*
Phillip Rogaway, "OCB: A Block-Cipher Mode of Operatipon for Efficient Authenticated Encryption," ACM Transactions on Information and System Security, vol. 6, No. 3, Aug. 2003, pp. 365-403.*
International Search Report and Written Opinion of the International Searching Authority, issued for corresponding PCT Application No. PCT/US2013/030158; dated Feb. 4, 2014.
Alfred J. Menezes et al., "Handbook of Applied Cryptography", CRC Press, 1997, ISBN 0-8493-8523-7.
Morris Dworkin, "Recommendation for Block Cipher Modes of Operation, Methods and Techniques", NIST Special Publication 800-38A 2001 Edition, Dec. 2001.
Morris Dworkin, "Recommendation for Block Cipher Modes of Operation, The CCM Mode for Authentication and Confidentiality", NIST Special Publication 800-38C, May 2004.
(Continued)

*Primary Examiner* — Luu Pham
*Assistant Examiner* — Canh Le
(74) *Attorney, Agent, or Firm* — Fish & Richardson P.C.

(57) ABSTRACT

A computer-implemented authenticated encryption method for converting a plaintext message into a ciphertext message. The method includes dividing the plaintext message into at least two working blocks, each working block having a mathematical relationship to the plaintext message. For each working block, a working block ciphertext is computed as a function of such working block, a deterministic working block initialization vector, and a deterministic working block encryption key. For each working block, a message authentication tag is computed as a function of a deterministic working block message authentication key and at least one of (a) the working block ciphertext computed for such working block and an indication corresponding to the mathematical relationship of such working block to the plaintext message and (b) such working block. The method further includes computing a global message authentication tag as a function of the message authentication tag computed for each working block and a global message authentication key. The ciphertext message comprises the working block ciphertext computed for each working block and the global message authentication tag.

17 Claims, 7 Drawing Sheets

(58) Field of Classification Search
USPC .......................................................... 380/28
See application file for complete search history.

(56) References Cited

U.S. PATENT DOCUMENTS

| | | | |
|---|---|---|---|
| 2002/0048364 A1* | 4/2002 | Gligor | H04L 9/0637 380/37 |
| 2002/0051537 A1* | 5/2002 | Rogaway | H04L 9/0643 380/46 |
| 2002/0071552 A1* | 6/2002 | Rogaway | H04L 9/0637 380/37 |
| 2004/0017913 A1* | 1/2004 | Hawkes et al. | 380/37 |
| 2004/0019785 A1* | 1/2004 | Hawkes et al. | 713/168 |
| 2005/0213752 A1* | 9/2005 | Hawkes et al. | 380/28 |
| 2006/0285684 A1* | 12/2006 | Rogaway | H04L 9/0637 380/37 |
| 2008/0084996 A1 | 4/2008 | Chen et al. | |
| 2008/0172562 A1 | 7/2008 | Cachin et al. | |
| 2010/0027783 A1* | 2/2010 | Yup | 380/44 |
| 2010/0158243 A1* | 6/2010 | Tian | H04L 9/0637 380/37 |
| 2010/0303229 A1* | 12/2010 | Unruh | 380/28 |

OTHER PUBLICATIONS

Morris Dworkin, "Recommendation for Block Cipher Modes of Operation, The Galois/Counter Mode (GCM) and GMAC", NIST Special Publication 800-38D, Nov. 2007.

Oliver Eikemeier et al., "History-Free Aggregate Message Authentication Codes", Lecture Notes in Computer Science, vol. 6280, pp. 309-328, Springer-Verlag, 2010.

Jonathan Katz et al., "Aggregate Message Authentication Codes", Topics in Cryptology—Cryptographer's Track, RSA Conference (CT-RSA) '08, Lecture Notes in Computer Science, pp. 155-169, Springer-Verlag, 2008.

International Preliminary Report on Patentability issued in International Application No. PCT/US2013/030158 dated Jun. 11, 2015; 9 Pages.

* cited by examiner

US 9,917,695 B2

AUTHENTICATED ENCRYPTION METHOD USING WORKING BLOCKS

FIELD OF THE DISCLOSURE

The present disclosure relates generally to the field of cryptography and more particularly to an authenticated encryption algorithm that allows parallel computation and streaming.

BACKGROUND

Encryption algorithms are designed to provide message privacy, but may not enable a receiver to detect alterations to a message during transmission from a sender to a receiver, that is, such algorithms may not provide a guarantee of message integrity. Message authentication codes, in contrast, are designed to provide message integrity, but may not obscure the content of the message from unauthorized third parties, that is, such codes may not provide a guarantee of message privacy. Authenticated encryption algorithms are a known class of cryptographic algorithms that provide a guarantee of both message privacy and message integrity.

Parallel computation is a computing paradigm wherein complex computational tasks are divided into sub-tasks and such sub-tasks are processed in parallel. By employing a plurality of processors to complete sub-tasks in parallel, the real-world time required for completing a task may be substantially reduced. However, not all algorithms are suitable for parallel computation, in part depending upon the extent to which an algorithm may be divided into substantially independent sub-tasks.

Computing devices typically comprise various types of computer storage having different characteristics. For example, modern personal computers may comprise several gigabytes of high-speed random-access memory (RAM) and several terabytes of storage in the form of, for example, a mechanical hard disk drive having significantly slower data access and transfer times than RAM. Typically, due to the disparity in data access and data transfer times, among other things, the input for a data processing algorithm is loaded or received into RAM from data storage means or data receiving means prior to being operated upon while stored in RAM.

Particularly for the processing of large data sets that may exceed the available RAM of a computing device, whether an algorithm is capable of operating on only the portion loaded into RAM of such a larger data set may be relevant. If so, in some cases, the algorithm is said to be capable is operating in a streaming manner. As for parallel computation, not all algorithms are capable of operating in a streaming manner.

Certain prior art encryption algorithms such as block ciphers operating in a mode of operation known as counter mode support parallel computation. Certain other prior art encryption algorithms may be operated in a streaming manner.

BRIEF DESCRIPTION OF THE DRAWINGS

Non-limiting examples of various embodiments of the present disclosure will next be described in relation to the drawings, in which.

DETAILED DESCRIPTION

Figure 1:
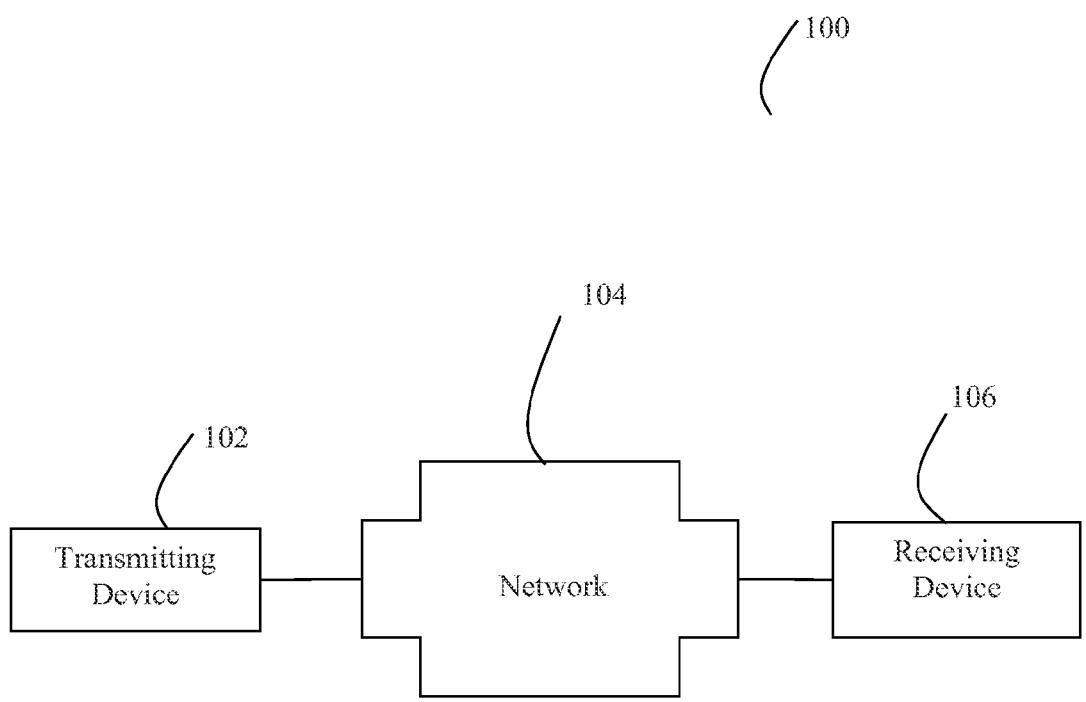
FIG. 1 is a block diagram of a system in accordance with an exemplary embodiment of the present disclosure.

In a first broad aspect of the present disclosure, there is provided a computer-implemented authenticated encryption method for converting a plaintext message into a ciphertext message, the method comprising: dividing the plaintext message into at least two working blocks, each working block having a mathematical relationship to the plaintext message; for each working block, computing a working block ciphertext as a function of such working block, a deterministic working block initialization vector, and a deterministic working block encryption key; for each working block, computing a message authentication tag as a function of a deterministic working block message authentication key and at least one of (a) the working block ciphertext computed for such working block and an indication corresponding to the mathematical relationship of such working block to the plaintext message and (b) such working block; computing a global message authentication tag as a function of the message authentication tag computed for each working block and a global message authentication key; and wherein the ciphertext message comprises the working block ciphertext computed for each working block and the global message authentication tag.

In an alternative embodiment, the method further comprising: providing an updated plaintext message that is an update to the plaintext message; dividing the updated plaintext message into at least two updated working blocks, each updated working block having a mathematical relationship to the updated plaintext message and corresponding to one of the working blocks; identifying at least one updated working block that is affected by the update to the plaintext message; for each identified updated working block, computing an updated working block ciphertext as a function of such identified updated working block, a deterministic working block initialization vector, and a deterministic working block encryption key; for each identified updated working block, computing an updated message authentication tag as a function of a deterministic working block message authentication key and at least one of (a) the updated working block ciphertext computed for such identified updated working block and an indication corresponding to the mathematical relationship of such identified updated working block to the updated plaintext message and (b) such identified updated working block; computing an updated global message authentication tag as a function of the global message authentication tag, the updated message authentication tag computed for each identified updated working block, the message authentication tag computed for the working block corresponding to each identified updated working block, and the global message authentication key; and wherein an updated ciphertext message comprises the working block ciphertext computed for each working block not identified, if any, the updated working block ciphertext computed for each identified updated working block, and the updated global message authentication tag.

In an alternative embodiment, the ciphertext message further comprises the message authentication tag computed for each working block.

In an alternative embodiment, the dividing the plaintext message into at least two working blocks comprises partitioning the plaintext message into at least two working blocks.

In an alternative embodiment, for each working block, the indication corresponding to the mathematical relationship of such working block to the plaintext message comprises an indication corresponding to a position of such working block within the plaintext message.

In an alternative embodiment, for each working block, the deterministic working block initialization vector used to compute the working block ciphertext computed for such working block is a function of a global initialization vector and the indication corresponding to the position of such working block within the plaintext message.

In an alternative embodiment, for each working block, the deterministic working block encryption key used to compute the working block ciphertext computed for such working block is a single encryption key common to the at least two working blocks.

In an alternative embodiment, for each working block, the deterministic working block message authentication key used to compute the message authentication tag computed for such working block is the global message authentication key.

In an alternative embodiment, the computing a global message authentication tag is further a function of the length of each working block.

In an alternative embodiment, the computing a global message authentication tag is further a function of the global initialization vector.

In an alternative embodiment, for each working block, the computing a message authentication tag for such working block comprises computing a function of a deterministic working block message authentication key and such working block.

In an alternative embodiment, for each working block, the computing a message authentication tag for such working block comprises computing a function of a deterministic working block message authentication key, the working block ciphertext computed for such working block, and at least one of (a) the deterministic working block initialization vector used to compute the working block ciphertext computed for such working block and (b) the indication corresponding to the position of such working block within the plaintext message.

In an alternative embodiment, for each working block, the deterministic working block message authentication key used to compute the message authentication tag for such working block is a function of an initial value and the indication corresponding to the position of such working block within the plaintext message; wherein, for each working block, the computing a message authentication tag for such working block comprises computing a function of a deterministic working block message authentication key and the working block ciphertext computed for such working block.

In a second broad aspect of the present disclosure, there is provided a computer-implemented method for converting at least two ciphertext working blocks into a plaintext message, the at least two ciphertext working blocks associated with a global message authentication tag, the method comprising: for each ciphertext working block, computing a plaintext working block as a function of such ciphertext working block, a deterministic working block initialization vector, and a deterministic working block decryption key; for each ciphertext working block, computing a message authentication tag as a function of a deterministic working block message authentication key and at least one of (a) such ciphertext working block and an indication corresponding to a mathematical relationship of such ciphertext working block to the plaintext message and (b) the plaintext working block computed for such ciphertext working block; computing a global message authentication tag as a function of the message authentication tag computed for each working block and a global message authentication key; comparing the computed global message authentication tag with the global message authentication tag associated with the at least two ciphertext working blocks; and wherein the plaintext message comprises each plaintext working block computed for each ciphertext working block.

In an alternative embodiment, each ciphertext working block is associated with a message authentication tag and wherein the method further comprises, for each ciphertext working block, comparing the message authentication tag computed for such ciphertext working block with the message authentication tag associated with such ciphertext working block.

In an alternative embodiment, the plaintext message comprises the concatenation of each plaintext working block computed for each ciphertext working block In an alternative embodiment, for each ciphertext working block, the indication corresponding to the mathematical relationship of such ciphertext working block to the plaintext message comprises an indication corresponding to a position of the plaintext working block computed for such ciphertext working block within the plaintext message.

In an alternative embodiment, for each ciphertext working block, the deterministic working block initialization vector used to compute the plaintext working block for such ciphertext working block is a function of a global initialization vector and the indication corresponding to the position of the plaintext working block computed for such ciphertext working block within the plaintext message.

In an alternative embodiment, for each ciphertext working block, the deterministic working block decryption key used to compute the plaintext working block for such ciphertext working block is a single decryption key common to the at least two ciphertext working blocks.

In an alternative embodiment, for each ciphertext working block, the deterministic working block message authentication key used to compute the message authentication tag for such ciphertext working block is the global message authentication key.

In an alternative embodiment, the computing a global message authentication tag is further a function of the length of each plaintext working block computed for each ciphertext working block.

In an alternative embodiment, the computing a global message authentication tag is further a function of the global initialization vector.

In an alternative embodiment, for each ciphertext working block, the computing a message authentication tag comprises computing a function of a deterministic working block message authentication key and the plaintext working block computed for such ciphertext working block.

In an alternative embodiment, for each ciphertext working block, the computing a message authentication tag comprises computing a function of a deterministic working block message authentication key, such ciphertext working block, and at least one of (a) the deterministic working block initialization vector used to compute the plaintext working block for such ciphertext working block and (b) the indication corresponding to the position of the plaintext working block computed for such ciphertext working block within the plaintext message.

In an alternative embodiment, for each ciphertext working block, the deterministic working block message authentication key used to compute the message authentication tag for such ciphertext working block is a function of an initial value and the indication corresponding to the position of the plaintext working block computed for such ciphertext working block within the plaintext message; wherein, for each ciphertext working block, the computing a message authentication tag for such ciphertext working block comprises computing a function of a deterministic working block message authentication key and such ciphertext working block.

In a third broad aspect of the present disclosure, there is provided a computer-implemented message authentication method for producing message authentication information, the method comprising: dividing a message into at least two working blocks, each working block having a mathematical relationship to the message; for each working block, computing a message authentication tag as a function of such working block and at least one of (a) a global message authentication key and an indication corresponding to the mathematical relationship of such working block to the message and (b) a deterministic working block message authentication key that comprises an indication corresponding to the mathematical relationship of such working block to the message; computing a global message authentication tag as a function of the message authentication tag computed for each working block and the global message authentication key; and wherein the message authentication information comprises the global message authentication tag.

In an alternative embodiment, the message authentication information further comprises the message authentication tag computed for each working block.

In an alternative embodiment, the dividing the message into at least two working blocks comprises partitioning the message into at least two working blocks.

In an alternative embodiment, for each working block, the indication corresponding to the mathematical relationship of such working block to the message comprises an indication corresponding to a position of such working block within the message.

In an alternative embodiment, the computing a global message authentication tag is further a function of the length of each working block.

In an alternative embodiment, for each working block, the deterministic working block message authentication key that comprises an indication corresponding to the mathematical relationship of such working block to the message is a function of an initial value and an indication corresponding to a position of such working block within the message.

In a fourth broad aspect of the present disclosure, there is provided a computer-implemented method for determining the authenticity of at least two working blocks comprising a message, the at least two working blocks associated with a global message authentication tag, the method comprising: for each working block, computing a message authentication tag as a function of such working block and at least one of (a) a global message authentication key and an indication corresponding to a mathematical relationship of such working block to the message and (b) a deterministic working block message authentication key that comprises an indication corresponding to the mathematical relationship of such working block to the message; computing a global message authentication tag as a function of the message authentication tag computed for each working block and the global message authentication key; and comparing the computed global message authentication tag with the global message authentication tag associated with the at least two working blocks.

In an alternative embodiment, each working block is associated with a message authentication tag and wherein the method further comprises, for each working block, comparing the message authentication tag computed for such working block with the message authentication tag associated with the working block.

In an alternative embodiment, the message comprises the concatenation of each working block.

In an alternative embodiment, for each working block, the indication corresponding to the mathematical relationship of such working block to the message comprises an indication corresponding to a position of such working block within the message.

In an alternative embodiment, the computing a global message authentication tag is further a function of the length of each working block.

In an alternative embodiment, for each working block, the deterministic working block message authentication key that comprises an indication corresponding to the mathematical relationship of such working block to the message is a function of an initial value and an indication corresponding to a position of such working block within the message.

In a fifth broad aspect of the present disclosure, there is provided a computer-implemented method for generating an updated ciphertext message from an original ciphertext message, an original plaintext message, and an updated plaintext message that is an update to the original plaintext message, wherein the original plaintext message was converted into the original ciphertext message by dividing the original plaintext message into at least two original working blocks, each original working block having a mathematical relationship to the original plaintext message; for each original working block, computing an original working block ciphertext as a function of such original working block, a deterministic working block initialization vector, and a deterministic working block encryption key; for each original working block, computing an original message authentication tag as a function of a deterministic working block message authentication key and at least one of (a) the original working block ciphertext computed for such original working block and an indication corresponding to the mathematical relationship of such original working block to the original plaintext message and (b) such original working block; computing an original global message authentication tag as a function of the original message authentication tag computed for each original working block and a global message authentication key; and wherein the original ciphertext message comprises the original working block ciphertext computed for each original working block and the original global message authentication tag; the method comprising: dividing the updated plaintext message into at least two updated working blocks, each updated working block having a mathematical relationship to the updated plaintext message and corresponding to one of the original working blocks; identifying at least one updated working block that is affected by the update to the original plaintext message; for each identified updated working block, computing an updated working block ciphertext as a function of such identified updated working block, a deterministic working block initialization vector, and a deterministic working block encryption key; for each identified updated working block, computing an updated message authentication tag as a function of a deterministic working block message authentication key and at least one of (a) the updated working block ciphertext computed for such identified updated working block and an indication corresponding to the mathematical relationship of such identified updated working block to the updated plaintext message and (b) such identified updated working block; computing an updated global message authentication tag as a function of the original global message authentication tag, the updated message authentication tag computed for each identified updated working block, the original message authentication tag computed for the original working block corresponding to each identified updated working block, and the global message authentication key; and wherein the updated ciphertext message comprises the original working block ciphertext computed for each original working block not identified, if any, the updated working block ciphertext computed for each identified updated working block, and the updated global message authentication tag.

In a sixth broad aspect of the present disclosure, there is provided a computer readable memory storing computer executable instructions thereon that when executed by a computer perform the method of at least one of the first, second, third, fourth, and fifth broad aspects of the present disclosure.

Additional aspects and advantages of the present disclosure will be apparent in view of the description which follows. It should be understood, however, that the detailed description, while indicating embodiments of the disclosure, are given by way of illustration only, since various changes and modifications within the spirit and scope of the disclosure will become apparent to those skilled in the art from this detailed description.

In the following description, details are set forth to provide an understanding of illustrative embodiments of the disclosure. In some instances, certain software, hardware, networking infrastructure, circuits, structures and techniques have not been described or shown in detail in order not to obscure the application. Those of skill in the art will understand that the following detailed description of illustrative embodiments of the disclosure does not limit the implementation of embodiments of the disclosure to any particular computer programming language. Embodiments of the disclosure may be implemented in any computer programming language provided that the operating system ("OS") provides the facilities that may support the requirements of the present disclosure. For instance, an embodiment of the present disclosure may be implemented in the JAVA™ computer programming language (or other computer programming languages such as C or C++). Those skilled in this art will also appreciate that any limitations presented by such an embodiment would be a result of a particular type of operating system or computer programming language and would not be a limitation of the present disclosure. Alternative embodiments of the present disclosure may also be implemented in hardware or in a combination of hardware and software.

FIG. 1 illustrates a system 100 exemplary of an embodiment of the present disclosure. System 100 comprises a transmitting device 102, a receiving device 106, and network 104 through which transmitting device 102 transmits messages to receiving device 106 using, among other things, the methods disclosed herein.

In an exemplary embodiment, network 104 may be the Internet. Alternatively, in other embodiments of the present disclosure, network 104 may be any other means of enabling communication between transmitting device 102 and receiving device 106, including a local area network, a wide area network, a virtual private network, or even offline communication means such as means for enabling the physical transfer of computer readable media between transmitting device 102 and receiving device 106. Network 104 is presumed to be insecure in that third-parties are assumed to have access to some or all messages transmitted from transmitting device 102 to receiving device 106.

Transmitting device 102 may be any suitable computing device, such as a mobile handset. Receiving device 106 may similarly be any suitable computing device, such as a computer server. Although a unidirectional transmission from transmitting device 102 to receiving device 106 is described herein, a skilled person in the relevant art will appreciate that bidirectional communication is also possible using the methods described herein, in which case transmitting device 102 and receiving device 106 are both transmitting and receiving messages from one another using the same or different communication protocols and encryption methods. Transmitting device 102 and receiving device 106 may also, in some embodiments, comprise the same device. For example, a given device may perform encryption operation 200 (as described herein) in respect of certain data, save such data in encrypted form to local or network storage, and at some later point in time, perform decryption operation 300 (as described herein) in respect of the encrypted data to retrieve the original data. In such circumstances, the device is operating as transmitting device 102 when performing encryption operation 200, and is operating as receiving device 106 when performing decryption operation 300.

Transmitting device 102 and receiving device 106 may include computer executable programmed instructions for directing such devices to operate in a pre-determined manner. The programmed instructions may be embodied in one or more hardware or software modules which may be resident in the memory or storage of devices 102, 106. Alternatively, the programmed instructions may be embodied on a computer readable medium (such as a compact disk or floppy disk) which may be used for transporting the programmed instructions to the memory or storage of devices 102, 106. Alternatively, the programmed instructions may be embedded in a computer-readable signal or signal-bearing medium that may be uploaded to network 104 by a vendor or supplier of the programmed instructions, and this signal or signal-bearing medium may be downloaded through a suitable interface to the memory or storage of devices 102, 106 from the network 104 by end users.

Figure 2:
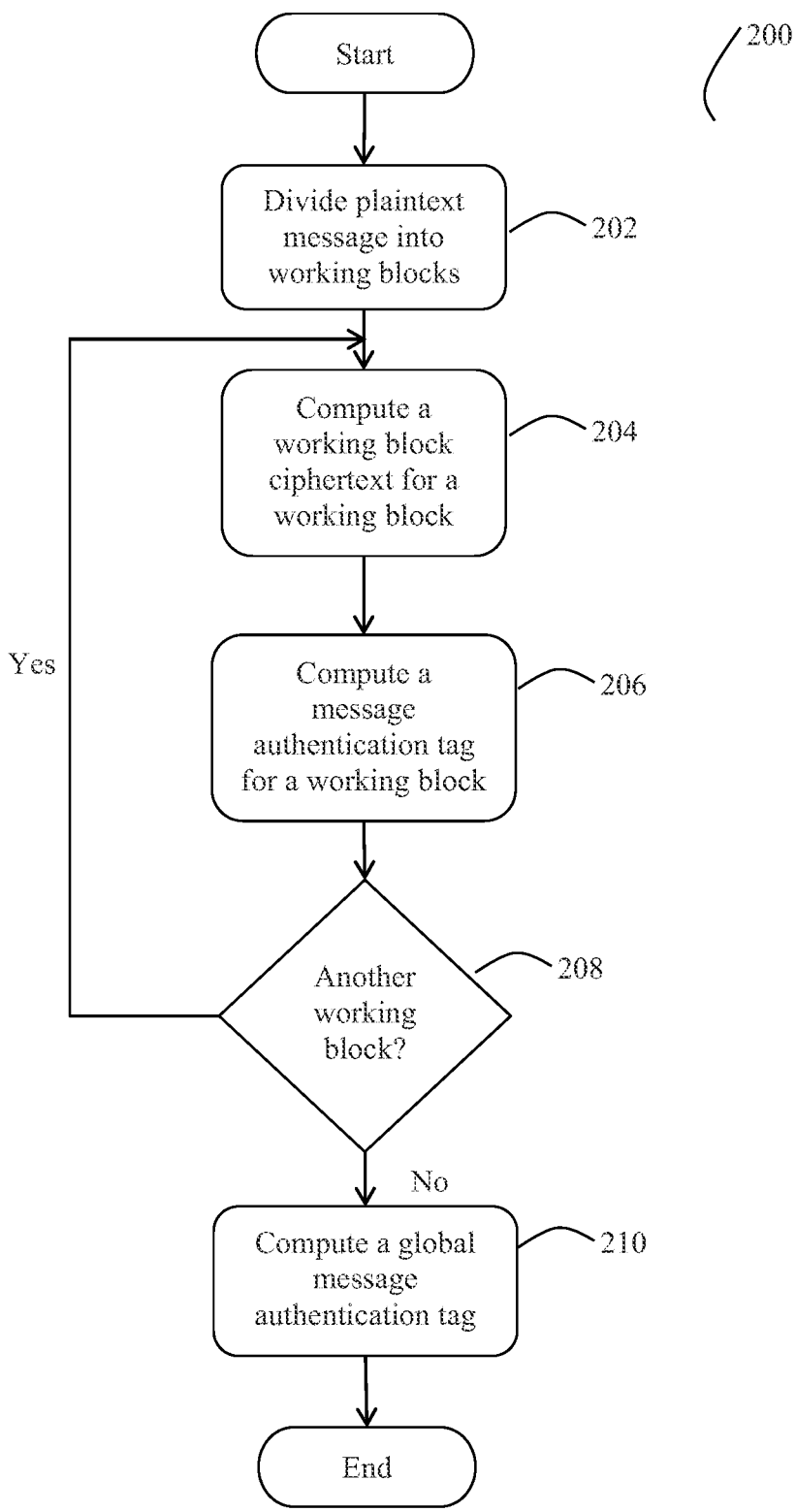
FIG. 2 is a flow diagram depicting an encryption operation in accordance with an exemplary embodiment of the present disclosure.
Figure 4:
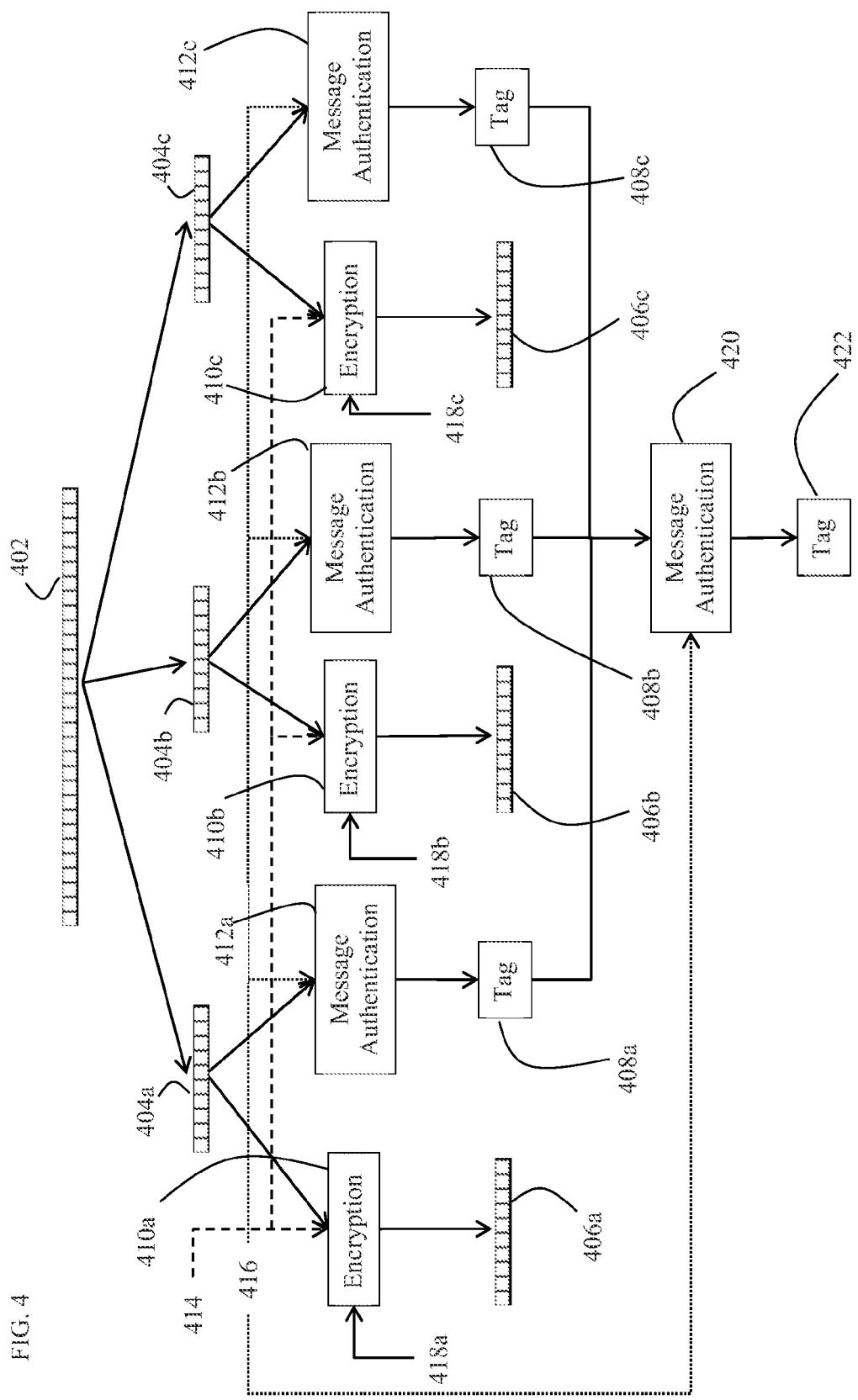
FIG. 4 is a block diagram depicting the encryption operation of FIG. 2 wherein message authentication is a function of a plaintext working block.

FIG. 2 is a flow diagram depicting an encryption operation 200 performed by transmitting device 102 to encrypt a plaintext message into ciphertext prior to transmission to receiving device 106. FIG. 4 is a block diagram depicting encryption operation 200 in an exemplary embodiment wherein a message authentication tag is computed as a function of a plaintext working block (instead of its ciphertext equivalent), as described in greater detail herein.

For the purposes of illustration, FIG. 4 depicts plaintext message 402 illustratively divided into three working blocks, namely, working blocks 404a, 404b, 404c and the description herein adopts such assumption. In other embodiments of the present disclosure, plaintext message 402 may be divided into a different number of working blocks, provided there are at least two working blocks.

Where encryption modules 410a, 410b, 410c use block ciphers as illustratively described herein, each working block may be selected to be a multiple of the block size of such block cipher. For example, if a 128 bit block size is used, the working blocks may be sized to be 1024 bits. More generally, a skilled person in the relevant art will be capable of selecting a suitable working block size that is appropriate in view of, among other things, the computer hardware that will be performing encryption operation 200 and decryption operation 300, and the choice and configuration of specific encryption modules 410a, 410b, 410c, decryption modules 604a, 604b, 604c, and message authentication modules 412a, 412b, 412c, 420, all as described in greater detail herein. For example, if encryption modules 410a, 410b, 410c are stream ciphers, the size of the working blocks may be more flexible.

Figure 3:
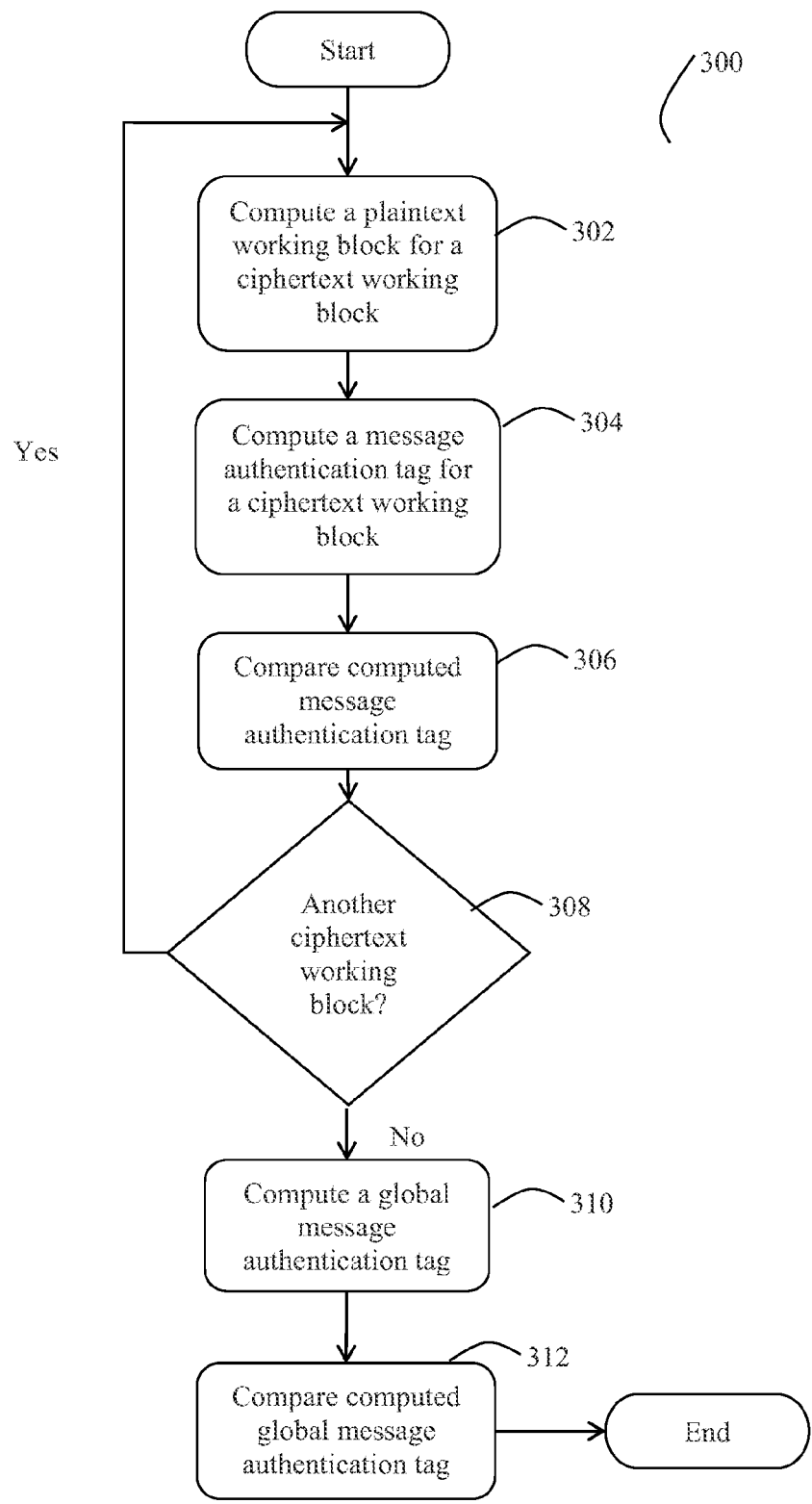
FIG. 3 is a flow diagram depicting a decryption operation in accordance with an exemplary embodiment of the present disclosure.
Figure 6:
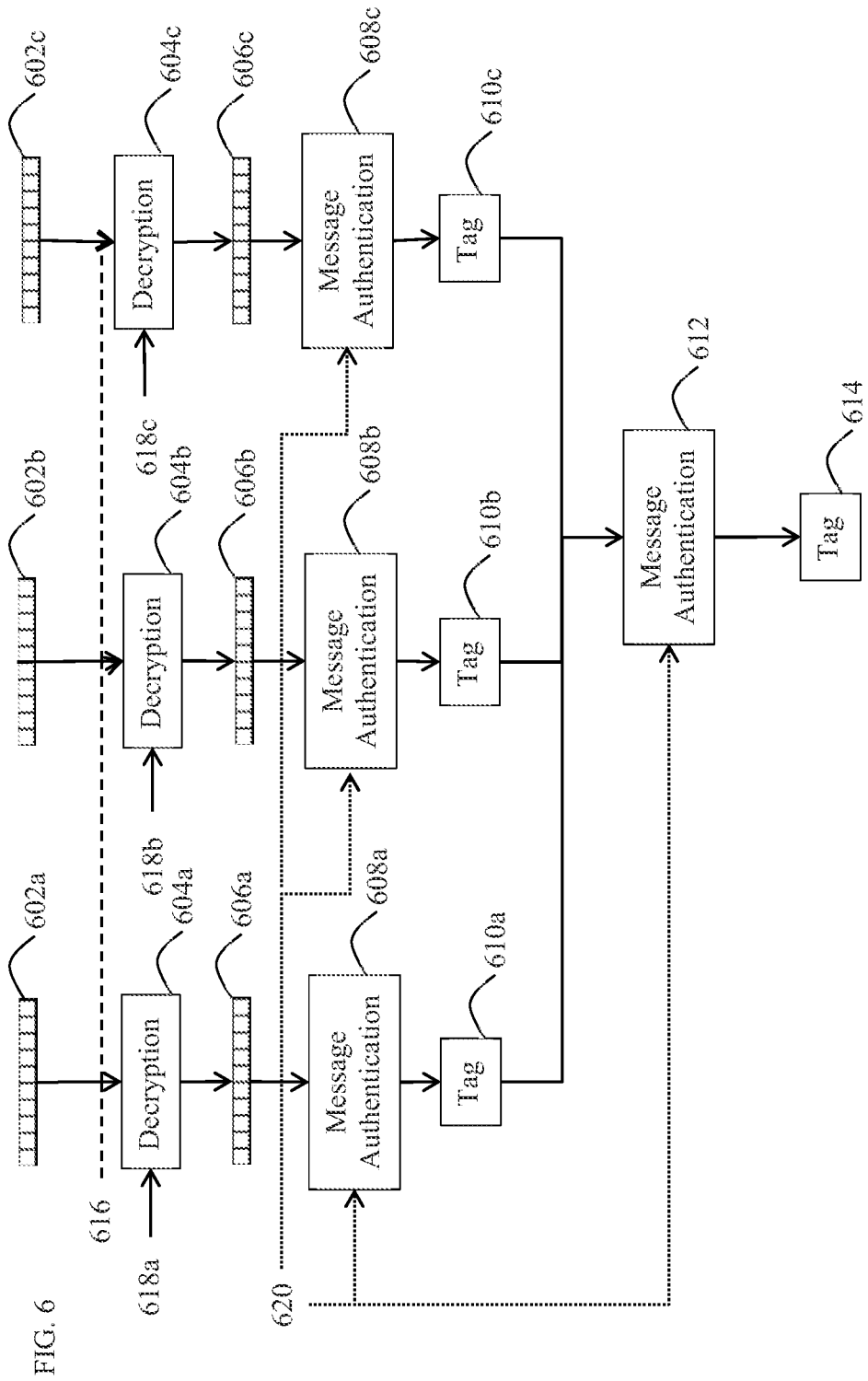
FIG. 6 is a block diagram depicting the decryption operation of FIG. 3 wherein message authentication is a function of a plaintext working block.

Corresponding to FIG. 2, FIG. 3 is a flow diagram depicting decryption operation 300 performed by receiving device 106 to decrypt ciphertext received from transmitting device 102 into plaintext. FIG. 6 is a block diagram depicting decryption operation 300 in an exemplary embodiment of the present disclosure corresponding to that depicted by FIG. 4 wherein ciphertext working blocks 602a, 602b, 602c are decrypted into plaintext working blocks 606a, 606b, 606c (that jointly comprise a single message).

Prior to performing certain steps of encryption operation 200 and decryption operation 300, transmitting device 102 and receiving device 106 may be illustratively configured to have certain data and to be capable of performing certain methods (collectively, "information").

More specifically, for encryption operation 200 and decryption operation 300, the following information must be shared between transmitting device 102 and receiving device 106: (a) encryption modules 410a, 410b, 410c that correspond with decryption modules 604a, 604b, 604c; (b) encryption key 414 that is the same as decryption key 616; (c) initialization vectors 418a, 418b, 418c that are respectively the same as initialization vectors 618a, 618b, and 618c; (d) message authentication modules 412a, 412b, 412c, 420 that are respectively the same as message authentication modules 608a, 608b, 608c, 612; and (e) message authentication key 416 that is the same as message authentication key 620.

A skilled person in the relevant art will be familiar with each of these identified components related to encryption operation 200 and decryption operation 300. In the field of cryptography, some or all of such components may be known as cryptographic primitives and form the building blocks of cryptographic systems. These components are well understood by those of skill in the art but are briefly described herein in relation to the various specific modules depicted in FIGS. 4 and 6.

Encryption/Decryption Modules: In an illustrative embodiment, encryption modules 410a, 410b, 410c use block ciphers wherein for a given plaintext message, such message is divided into fixed length blocks and encrypted. However, for greater certainty, a skilled person in the relevant art will appreciate that different types of ciphers may be used for encryption modules 410a, 410b, 410c, such as stream ciphers. Illustratively, encryption modules 410a, 410b, 410c implement an encryption method wherein the output of the module (i.e. the ciphertext) is a function of the input to the module (i.e. the plaintext), as well as an encryption key, and, in many cases, an initialization vector. The encryption module illustratively implements a symmetric key algorithm such as DES, Triple DES, Camellia, or AES, such implementation being the cryptographic primitive that receives a plaintext message and converts such message into ciphertext using the encryption key.

For example, illustrative encryption module 410a could execute a block cipher in the well-known cipher-block chaining mode using the Triple DES cipher. In such an embodiment, for a given plaintext message, (a) for the first plaintext block of the plaintext message (such plaintext block having a length corresponding to the block size of encryption module 410a, which is 64 bits if using the Triple DES cipher), the initialization vector XOR the first plaintext block is encrypted using the Triple DES cipher and the encryption key to result in the computed ciphertext corresponding to the first plaintext block; and (b) for each subsequent plaintext block of the plaintext message (each block again corresponding to the block size of encryption module 410a), the ciphertext corresponding to the previous block XOR the current plaintext block is encrypted using the Triple DES cipher and the encryption key to result in the computed ciphertext corresponding to the current plaintext block. The output of encryption module 410a is therefore the concatenation of the ciphertext derived for each block of the plaintext message.

In another embodiment, encryption module 410a could execute a block cipher in the well-known counter mode using the AES cipher. Whereas in cipher-block chaining mode the ciphertext of the previous block of a message XOR the current plaintext block is generally the input into the cipher (i.e. the AES cipher in this illustrative embodiment), in counter mode, the corresponding input into the cipher is a function of the initialization vector and a counter (a "counter function"), which may be as simple as the concatenation of the initialization vector and a counter that increments by one for each block. The ciphertext corresponding to each block is computed to be the encrypted output of the cipher XOR the corresponding plaintext block, and the overall output of encryption module 410a is again the concatenation of the ciphertext derived for each block of the plaintext message.

A person of skill in the relevant art will further appreciate that in order for encryption operation 200 and decryption operation 300 to successfully operate, encryption modules 410a, 410b, 410c and decryption modules 604a, 604b, 604c must correspond. A person of skill in the relevant art will also be familiar with selecting and configuring such corresponding modules.

For example, if illustrative encryption module 410a operates in cipher-block chaining mode using the Triple-DES cipher, illustrative decryption module 604a should, for a given ciphertext message, compute the first plaintext block of the original message by (i) decrypting the first ciphertext block using the Triple-DES decryption algorithm and decryption key, and (ii) computing the original plaintext block as the decrypted value XOR the initialization vector. For subsequent plaintext blocks, for the second step, the plaintext block is the decrypted value XOR the previous ciphertext block. In this illustrative embodiment, the output of decryption module 604a is the concatenation of the plaintext derived for each block of the ciphertext message, and such plaintext corresponds to the message originally encrypted by encryption module 410a using the same encryption key and initialization vector.

Similarly, if encryption module 410a operated in counter mode using the AES cipher, illustrative decryption module 604a may compute the plaintext corresponding to each ciphertext block by (i) using the same counter function as used by encryption module 410a, and (ii) for each ciphertext block, (a) encrypting the outcome of the counter function using the AES cipher and the same encryption key, and (b) computing the corresponding plaintext to be the encrypted outcome of the counter function XOR the ciphertext block.

Encryption and Decryption Keys: As described above, encryption and decryption modules such as encryption modules 410a, 410b, 410c and decryption modules 604a, 604b, 604c require encryption and decryption keys such as encryption key 414 and decryption key 616. A person of skill in the relevant art will appreciate that in symmetric key cryptography, such keys are the basis for maintaining message privacy and that the keys must only be known to the transmitting and receiving parties (i.e. transmitting device 102 and receiving device 106) and not third parties. For example, transmitting device 102 and receiving device 106 may share knowledge of a 128 bit key generated by transmitting device 102 using a pseudorandom key generator and shared with receiving device 106 over a low-bandwidth but secure out-of-band communications channel.

A person of skill in the relevant art will further appreciate that in symmetric key cryptography, encryption key 414 and decryption key 616 are typically identical. For example, in the specific illustrative embodiments of encryption modules 410a and decryption modules 604a described above, the same key is used by both modules.

For greater certainty, there may be certain requirements of encryption and decryption keys in order to achieve the security guarantees promised by various ciphers. Such requirements are well known to those of skill in the relevant art and are not discussed herein.

Initialization Vectors: Also as described above, encryption and decryption modules such as encryption modules 410a, 410b, 410c and decryption modules 604a, 604b, 604c may be designed to use initialization vectors such as initialization vectors 418a, 418b, 418c and initialization vectors 618a, 618b, and 618c. A person of skill in the relevant art will appreciate that for block ciphers, such initialization vectors are used to improve security by, for example, ensuring repeated use of the same encryption key with the same cipher on the same plaintext results in different ciphertext.

Illustrative examples of the use of initialization vectors in the context of block ciphers are as previously described by means of the illustrative modes of operation of cipher-block chaining and counter mode. A person of skill in the relevant art will further appreciate that in symmetric key cryptography, such initialization vectors, while potentially important to the overall security of the cryptographic system, do not need to be necessarily secret information known only to transmitting device 102 and receiving device 106. Moreover, such person will appreciate that for a particular ciphertext encrypted using a particular initialization vector, encryption key, and cipher, decrypting such ciphertext typically requires use of the same initialization vector, encryption key, and cipher.

For greater certainty, there may be certain requirements of initialization vectors in order to achieve the security guarantees such as those promised by certain block cipher modes of operation. Such requirements are well known to those of skill in the relevant art and are not discussed herein.

Message Authentication Modules and Keys: A skilled person in the relevant art will also be familiar with message authentication and methods of message authentication such as HMAC and CBC-MAC. Accordingly, message authentication modules 412a, 412b, 412c, 420 may illustratively implement any message authentication method wherein the output of the module (i.e. the message authentication tag, such as tags 408a, 408b, 408c, 422) is a function of the input to the module (i.e. the message) and a message authentication key, such as message authentication key 416.

As for encryption and decryption, a person of skill in the relevant will appreciate that message authentication typically involves the use of corresponding message authentication modules executed by the transmitting party and the receiving party. For example, illustrative message authentication module 412a (used as part of encryption operation 200) and illustrative message authentication module 608a (used as part of decryption operation 300) illustratively are the same. In an illustrative embodiment, message authentication module 412a may compute a particular tag 408a as a function of message 404a and message authentication key 416, and tag 408a is transmitted to a receiving device along with message 404a. The receiving device, such as receiving device 106, checks whether the received message is in its original form by (a) applying the same message authentication method, using the received message and message authentication key 416, to compute a message authentication tag and (b) comparing the computed message authentication tag to the tag received from the transmitting device (i.e. tag 408a). If the tags match, the receiving device knows that the received message is the same as the original message. If the tags are different, the receiving device knows that the received message is not the same as the original message.

Again, as for encryption and decryption keys, a person of skill in the relevant art will appreciate that a secret key (i.e. a message authentication key) is typically used by message authentication methods. Such keys are the basis for maintaining the integrity of the method, and should be known only to the transmitting and receiving parties (i.e. transmitting device 102 and receiving device 106) and not third parties. For example, transmitting device 102 and receiving device 106 may share knowledge of a 256 bit message authentication key generated by transmitting device 102 from a crytographic random number generator and previously shared with receiving device 106 via a Diffie-Hellman key exchange. That is, message authentication key 416 and message authentication key 620 are illustratively the same and are known only to transmitting device 102 and receiving device 106.

Lastly, in relation to the information that must be shared between transmitting device 102 and receiving device 106 to enable encryption operation 200 and decryption operation 300, a skilled person in the relevant art will appreciate that some information, such as encryption, decryption, and message authentication keys, must be necessarily secret except as between the transmitting device 102 and receiving device 106, as discussed above. For example, it will be understood that such keys form the basis of the guarantees of message privacy and message integrity provided by encryption ciphers and message authentication algorithms. A skilled person in the relevant art will also appreciate that other information, such as the choice and configuration of encryption cipher and mode of operation used by encryption and decryption modules and the choice and configuration of message authentication algorithm, while information that must be known by both devices 102, 106, need not necessarily by private information not known by third parties.

More generally, a skilled person in the relevant art will readily appreciate what information must be private, what information may be public, and what information must be shared.

Moreover, with regards to sharing information between transmitting device 102 and receiving device 106, such information sharing may be done at a point in time when transmitting device 102 and receiving device 106 are in secure communication. Alternatively, devices 102, 106 may be pre-configured to have such shared information at the time of initial manufacture. Devices 102, 106 may also employ a public handshaking protocol to mutually decide upon, for example, a suitable encryption cipher to use. In still other embodiments, devices 102, 106 may employ methods well known to those skilled in the art, such as public key cryptography methods, to securely communicate over insecure communications channels without sharing, in advance, any private information at all.

FIGS. 2, 3, 4 and 6 are now described in greater detail in view of the above description of the various constituent elements and components of encryption operation 200 and decryption operation 300.

As noted above, FIG. 2 is a flow diagram depicting an encryption operation 200 performed by transmitting device 102 to encrypt a plaintext message into ciphertext prior to transmission to receiving device 106. FIG. 4 is a block diagram depicting encryption operation 200 in an exemplary embodiment wherein a message authentication tag is computed as a function of a plaintext working block (instead of its ciphertext equivalent).

Plaintext message 402 is the message that transmitting device 102 is performing encryption operation 200 upon. At step 202, transmitting device 102 divides plaintext message 402 into working blocks 404a, 404b, 404c, the size of such working blocks as described in greater detail above and the choice of three working blocks merely a simplification for illustrative purposes. That is, in illustrative embodiments of the present disclosure, for a given plaintext message 402, a preselected working block size will be used to divide plaintext message 402 into a plurality of working blocks, provided there are at least two working blocks.

In the illustrative embodiment, transmitting device 102 divides plaintext message 402 into working blocks 404a, 404b, 404c by partitioning plaintext message 402. That is, given a preselected working block size of N bits, working block 404a corresponds to the first N bits of plaintext message 402, working block 404b corresponding to the next N bits of plaintext message 402, and 404c corresponds to the remaining N or less bits of plaintext message 402. If necessary or desirable in some illustrative embodiments, as will be appreciated by skilled persons in the art, padding may be used to cause working block 404c to be N bits in length even if there are less than N bits remaining of plaintext message 402.

In other illustrative embodiments, other methods of dividing plaintext message 402 into working blocks may be used. For example, plaintext message 402 may be divided into working blocks 404a, 404b, 404c by selecting every first, second, and third bit from plaintext message 402 and assigning such bits to the working blocks (i.e. interleaving in reverse). In still other illustrative embodiments, working blocks 404a, 404b, 404c may be different sizes. For example, where it is known that a given working block will be processed by a slower processor, such working block may be illustratively constructed to be smaller in size than another working block that will be processed by a faster processor, such that the real-world time to process both working blocks is similar.

Encryption operation 200 next comprises repeating steps 204 and 206 for each working block that plaintext message 402 is divided into, such as working blocks 404a, 404b, 404c.

In a first iteration, at step 204, transmitting device 102 computes a ciphertext for a given working block. For example, for working block 404a, such working block is the input into encryption module 410a, along with initialization vector 418a and encryption key 414, so as to compute working block ciphertext 406a.

At step 206, transmitting device 102 computes a message authentication tag for the same given working block. For example, for working block 404a, such working block is the input into message authentication module 412a, along with message authentication key 416, so as to compute message authentication tag 408a.

At step 208, if there are additional working blocks, transmitting device 102, as noted above, repeats steps 204 and 206 for each additional working block. That is, in the illustrative embodiment, in a second iteration, working block ciphertext 406b and message authentication tag 408b are computed from working block 404b using, among other things, initialization vector 418b, and in a third iteration, working block ciphertext 406c and message authentication tag 408c are computed from working block 404c using, among other things, initialization vector 418c.

The computed values, namely, working block ciphertext 406a, 406b, 406c and message authentication tags 408a, 408b, 408c may be further processed (not depicted) in various ways. In a first illustrative embodiment, the computed values may be saved to computer readable storage media in transmitting device 102, such as a hard disk, and subsequently communicated to receiving device 106 by any means for communicating electronic data. In other illustrative embodiments, the computed values may be immediately transmitted to receiving device 106 over network 104 in a streaming manner.

In still other illustrative embodiments, the iterative process described above may be completed in a parallel manner by completing steps 204 and 206, in relation to each working block, using a plurality of processors or processing cores. For example, if transmitting device 102 comprised a dual-core processor, the processing of different plaintext working blocks (e.g. working blocks 404a, 404b) may be conducted in parallel by both cores. In other embodiments of the present disclosure, such processing may be completed by using a plurality of devices. For example, if transmitting device 102 has access to a plurality of other computing devices, plaintext working blocks (e.g. working blocks 404c) may be communicated to such other devices along with an appropriate initialization vector and keys, such other devices may complete the necessary processing, and return the appropriate ciphertext and/or message authentication tag to transmitting device 102 for further processing, as applicable.

In the illustrative embodiment, encryption modules 410a, 410b, 410c operate in the same manner, that is, by using the same block cipher and mode of operation, and decryption modules 604a, 604b, 604c similarly correspond thereto. In other illustrative embodiments, encryption modules 410a, 410b, 410c may operate differently, such as by using different block ciphers, so long decryption modules 604a, 604b, 604c are selected and configured so as to respectively correspond to encryption modules 410a, 410b, 410c.

In the illustrative embodiment, encryption modules 410a, 410b, 410c use the same encryption key, namely, encryption key 414. In other illustrative embodiments, different encryption keys may be used by encryption modules 410a, 410b, 410c so long corresponding decryption keys are used by decryption modules 604a, 604b, 604c in a deterministic manner, that is, receiving device 106 can determine which decryption key to use when decrypting particular ciphertext. Such illustrative alternative may also be employed in relation to message authentication modules and message authentication keys.

In the illustrative embodiments, encryption modules 410a, 410b, 410c use different initialization vectors 418a, 418b, 418c that uniquely correspond to each working block. As described above, such initialization vectors also typically respectively correspond to initialization vectors 618a, 618b, 618c used by decryption modules 604a, 604b, 604c. In one illustrative embodiment of the present disclosure, an ordered list of randomly generated initialization vectors may be pre-shared between transmitting device 102 and receiving device 106 for used by encryption modules 410a, 410b, 410c and decryption modules 604a, 604b, 604c. That is, transmitting device 102 may have stored thereon a list of initialization vectors commencing with 418a, 418b, 418c, receiving device 106 may have stored thereon an equivalent list of corresponding initialization vectors commencing with 618a, 618b, 618c, and both devices are configured to select and use initialization vectors from such lists in a particular order, that is, in a deterministic manner.

In other illustrative embodiments, transmitting device 102 and receiving device 106 may be configured to generate, in a deterministic manner, an equivalent list of initialization vectors (i.e. both devices can determine the correct initialization vector to use for a given working block). For example, transmitting device 102 and receiving device 106 may be configured to use a particular global initialization vector and a particular increment function for the calculation of working block initialization vectors 418a, 418b, 418c and initialization vectors 618a, 618b, 618c. More specifically, in some embodiments the same methods used for block ciphers operating in counter mode to compute a counter (as illustratively described above) may be used to compute initialization vectors for different working blocks (i.e. initialization vectors 418a, 418b, 418c and initialization vectors 618a, 618b, 618c). For example, in one embodiment, a 10 bit counter could be concatenated together with a 10 bit global initialization vector in order to compute each working block initialization vector (i.e. initialization vectors 418a, 418b, 418c and initialization vectors 618a, 618b, 618c) by (a) initializing the counter to be 10 zero-bits (for the first working block), and by (b) incrementing by one the 10 bit counter to calculate each subsequent initialization vector (for each subsequent working block). By configuring transmitting device 102 and receiving device 106 to use the same global initialization vector and the same increment function, transmitting device 102 and receiving device 106 may therefore generate the same ordered list of initialization vectors for use in encryption operation 200 and decryption operation 300. A skilled person in the relevant art is capable of selecting suitable increment functions and will appreciate, for example, that one limitation of using such initialization vector generation scheme is that the computed initialization vectors will eventually repeat (for a fixed size initialization vector and increment function), and the period of such cycle is a practical limit for the number of working block initialization vectors that can be generated.

Once each working block is processed, at step 210, transmitting device 102 computes a global message authentication tag 422 as a function of the message authentication tag of each individual working block (i.e. message authentication tags 408a, 408b, 408c) as well as message authentication key 416. This computed global message authentication tag 422 may similarly be saved to computer readable storage media in transmitting device 102, such as a hard disk, and subsequently provided to receiving device 106 by any means for communicating electronic data, or, in other illustrative embodiments, immediately transmitted to receiving device 106 over network 104 in a streaming manner.

In an illustrative embodiment, the message authentication tags for each individual working block may be accumulated using an accumulator and the XOR operation. That is, at the start of encryption operation 200, transmitting device 102 may set an accumulator variable (not depicted) to equal zero, and as transmitting device 102 computes each message authentication tag for each working block (such as message authentication tag 408a for working block 404a), the accumulator is updated to equal the existing value of the accumulator XOR the computed message authentication tag. Following the processing of all working blocks (and the accumulation of all message authentication tags into the accumulator), the value of the accumulator may thus be what is used to compute global message authentication tag 422. Notably, (a) such accumulation is invariant to the order in which message authentication tags are accumulated, therefore conducive to parallel computation, and (b) such accumulation may be completed even if the computed values of steps 204 and 206 (i.e. ciphertext and message authentication tags) are immediately transmitted to receiving device 106 in a streaming fashion and not otherwise stored on transmitting device 102.

In other illustrative embodiments, global message authentication tag 422 may also be a function of the total length of working blocks 404a, 404b, 404c. For example, similar to the accumulation of message authentication tags 408a, 408b, 408c for working blocks 404a, 404b, 404c, the length of working blocks 404a, 404b, 404c may be accumulated using an accumulator, and global message authentication tag 422 may be a function of, for example, the concatenation of the accumulated message authentication tags and the accumulated length of the working blocks. A person of skill in the relevant art will appreciate that including the total length of working blocks 404a, 404b, 404c in the calculation of global message authentication tag 422 may permit identification of certain truncation-type attacks upon the integrity of the overall cryptographic system.

In still other illustrative embodiments wherein a global initialization vector is used together with an increment function to calculate initialization vectors 418a, 418b, 418c, global message authentication tag 422 may be further a function of such global initialization vector. For example, such global initialization vector may be also concatenated with the accumulated message authentication tags (and the accumulated length of the working blocks). A person of skill in the relevant art will also appreciate that including such global initialization vector in the calculation of global message authentication tag 422 may augment the security of the overall cryptographic system.

In the illustrative embodiments depicted herein, message authentication modules 412a, 412b, 412c, 420 and message authentication modules 608a, 608b, 608c, 612 use the same corresponding message authentication key (i.e. message authentication key 416, 620). In other illustrative embodiments of the present disclosure, different message authentication keys may be used by message authentication modules 412a, 412b, 412c, 420 so long corresponding message authentication keys are used by message authentication modules 608a, 608b, 608c, 612 in a deterministic manner, that is, receiving device 106 can determine which message authentication key to use when authenticating different values. For example, message authentication keys (and encryption keys)—also sometimes known as subkeys—could be generated in a similar fashion as for initialization vectors. That is, in some embodiments, such keys may be generated from an initial value (i.e. a global key) and a suitable increment function (as otherwise described herein).

The overall outcome of encryption operation 200 performed by transmitting device 102 is therefore the computation of various values, namely, working block ciphertext 406a, 406b, 406c and message authentication tags 408a, 408b, 408c, 422. As described above, such computed values may be, for example, saved to computer readable storage media in transmitting device 102 or immediately transmitted to receiving device 106 over network 104.

In other illustrative embodiments, the overall outcome of encryption operation 200 performed by transmitting device 102 is similarly the computation of various values, namely, working block ciphertext 406a, 406b, 406c and message authentication tag 422, but not message authentication tags 408a, 408b, 408c. As described above, such computed values may be, for example, saved to computer readable storage media in transmitting device 102 or immediately transmitted to receiving device 106 over network 104.

As described above, FIG. 3 is a flow diagram depicting decryption operation 300 performed by receiving device 106 to decrypt ciphertext received from transmitting device 102 into plaintext, and FIG. 6 is a block diagram depicting decryption operation 300 in an exemplary embodiment of the present disclosure corresponding to that depicted by FIG. 4 wherein ciphertext working blocks 602a, 602b, 602c are decrypted into plaintext working blocks 606a, 606b, 606c (that jointly comprise a single message).

Ciphertext working blocks 602a, 602b, 602c is part of the input that receiving device 106 receives in order to perform decryption operation 300, such input corresponding to a portion of the output of encryption operation 200, as described above. The other output of encryption operation 200, namely, message authentication tags, are also used by receiving device 106, as described herein. For greater certainty, and as described above, FIG. 6 depicts three ciphertext working blocks 602a, 602b, 602c merely as a simplification for illustrative purposes. In other embodiments, decryption operation 300 may be performed in relation to a plurality of working blocks more generally.

As a first matter, decryption operation 300 comprises repeating steps 302, 304, and 306 for each ciphertext working block that is received by receiving device 106, such as ciphertext working blocks 602a, 602b, 602c.

In a first iteration, at step 302, receiving device 106 computes the plaintext equivalent for a given ciphertext working block. For example, for ciphertext working block 602a, such ciphertext is the input into decryption module 604a, along with initialization vector 618a and decryption key 616, so as to compute plaintext working block 606a.

At step 304, receiving device 106 computes a message authentication tag for the previously computed plaintext working block. For example, for plaintext working block 606a, such plaintext working block is the input into message authentication module 608a, along with message authentication key 620, so as to compute message authentication tag 610a.

At step 306, receiving device 106 compares the computed message authentication tag for a particular working block with the message authentication tag that is received from transmitting device 102 and associated with such working block. For example, in an illustrative embodiment, receiving device 106 will have received a message authentication tag (not depicted) associated with ciphertext working block 602a, and at step 306, such tag is compared to message authentication tag 610a. If these tags are different, receiving device 106 knows that the received message was modified during transmission from transmitting device 102 and may, for example, be configured to advise a user that the received message has failed a message integrity test, request retransmission of the message from transmitting device 102, or take any other action appropriate in the circumstances, as will be appreciated by a skilled person in the relevant art.

A skilled person in the relevant art will similarly appreciate that step 306 would not be completed if no message authentication tag associated with a given working block is received from transmitting device 102. This corresponds to the illustrative embodiment disclosed above wherein the overall outcome of encryption operation 200 performed by transmitting device 102 is the computation of various values, namely, working block ciphertext 406a, 406b, 406c and message authentication tag 422, but not message authentication tags 408a, 408b, 408c.

At step 308, if there are additional ciphertext working blocks received, receiving device 106, as noted above, repeats steps 302, 304, 306 for each additional ciphertext working block. That is, in the illustrative embodiment, (a) in a second iteration, (i) plaintext working block 606b and message authentication tag 610b are computed using, among other things, initialization vector 618b, and (ii) message authentication tag 610b is compared to the received message authentication tag associated with ciphertext working block 602b, and, (b) in a third iteration, (i) plaintext working block 606c and message authentication tag 610c are computed using, among other things, initialization vector 618c, and (ii) message authentication tag 610c is compared to the received message authentication tag associated with ciphertext working block 602c. As noted above, if the message authentication tags are different at any comparison step, receiving device 106 knows that the received message was modified during transmission from transmitting device 102 and may, for example, be configured to advise a user that the received message has failed a message integrity test, request retransmission of the message from transmitting device 102, or take any other action appropriate in the circumstances, as will be appreciated by a skilled person in the relevant art.

In illustrative embodiments of the present disclosure, the computed values of relevance are plaintext working blocks 606a, 606b, 606c that jointly comprise the message that should correspond to plaintext message 402 that was the original input to encryption operation 200 (if the output of encryption operation 200 is the input to decryption operation 300). In some embodiments, plaintext working blocks 606a, 606b, 606c may be recombined by, for example, concatenating the working blocks and saving such to computer readable storage media in receiving device 106, such as a hard disk. Alternatively, if, for example, each working block corresponds to a portion of a video that is being streamed from transmitting device 102 to receiving device 106 for immediate presentation, receiving device 106 may insert the plaintext working block into a playback queue without otherwise saving this information in storage in receiving device 106.

As for encryption operation 200, in other illustrative embodiments, the iterative decryption process described above may be completed in a parallel manner by completing steps 302, 304, 306, in relation to each working block, using a plurality of processors or processing cores. For example, if receiving device 106 comprised a quad-core processor, the processing of ciphertext working blocks may be conducted in parallel by each core. In other embodiments of the present disclosure, such processing may be completed by using a plurality of devices. For example, if receiving device 106 has access to a plurality of other computing devices, ciphertext working blocks (e.g. ciphertext working block 602a) may be communicated to other devices along with the appropriate initialization vectors and keys, such other devices may complete the necessary processing, and return the computed plaintext to receiving device 106 for further processing, as applicable.

In other illustrative embodiments of the present disclosure, decryption modules may operate differently, different encryption keys may be used, and initialization vectors may be generated using different means, all as described in greater detail above in relation to encryption operation 200.

Once each ciphertext working block is processed, at step 310, receiving device 106 computes a message authentication tag 614 as a function of the computed message authentication tag of each individual ciphertext working block (i.e. message authentication tags 610a, 610b, 610c) as well as message authentication key 620.

At step 312, this computed message authentication tag 614 is compared to the global message authentication tag that is received from transmitting device 102 and associated with the message generally. For example, in an illustrative embodiment, receiving device 106 will have received a message authentication tag associated with the message generally, and at step 312, such tag is compared to message authentication tag 614. If these tags are different, receiving device 106 knows that the received message, in the aggregate, was modified during transmission from transmitting device 102. This may be so even if the message passed the working block specific comparison conducted at step 306. In illustrative embodiments, receiving device 106 may be configured to advise a user that the received message has failed a message integrity test or take any other action appropriate in the circumstances, as will be appreciated by a skilled person in the relevant art, including requesting retransmission of the message from transmitting device 102.

In an illustrative embodiment, as described above for encryption operation 200, the message authentication tags for each individual working block may be accumulated using an accumulator and the XOR operation. That is, at the start of encryption operation 300, receiving device 106 may set an accumulator variable (not depicted) to equal zero, and as receiving device 106 computes each message authentication tag (such as message authentication tag 610a), the accumulator is updated to equal the existing value of the accumulator XOR the computed message authentication tag. Following the processing of all working blocks (and the accumulation of all message authentication tags into the accumulator), the value of the accumulator may thus be what is used to compute global message authentication tag 614. Notably, such accumulation is invariant to the order in which message authentication tags are accumulated, therefore conducive to parallel computation.

In other illustrative embodiments, as described above for encryption operation 200, global message authentication tag 614 may also be a function of the total length of plaintext working blocks 606a, 606b, 606c. For example, similar to the accumulation of message authentication tags 606a, 606b, 606c for working blocks 606a, 606b, 606c, the length of working blocks 606a, 606b, 606c may be accumulated using an accumulator, and global message authentication tag 614 may be a function of, for example, the concatenation of the accumulated message authentication tags and the accumulated length of the working blocks.

In still other illustrative embodiments, as described above for encryption operation 200, where a global initialization vector is used together with an increment function to calculate initialization vectors 618a, 618b, 618c, global message authentication tag 614 may also be a function of such global initialization vector. For example, such global initialization vector may be also concatenated with the accumulated message authentication tags (and the accumulated length of the working blocks).

For greater certainty, a skilled person in the relevant art will appreciate that while message authentication modules 608a, 608b, 608c, 612 are capable of operating in various illustrative embodiments, including those described above, such modules must operate in a corresponding manner to message authentication modules 412a, 412b, 412c, 420 where all such modules are jointly part of single cryptographic system. For example, global message authentication tag 614 should only be a function of the total length of plaintext working blocks 606a, 606b, 606c if the message authentication tag associated with the message generally was known to have been computed as a function of the total length of corresponding working blocks 404a, 404b, 404c.

Message authentication tags 610a, 610b, 610c, 614 may be discarded once comparison steps 306 and 312 are successfully completed and authenticity of the message is verified. Alternatively, such tags may be retained for future verification purposes. As described above, plaintext working blocks 606a, 606b, 606c jointly comprise the message that should, for example, correspond to plaintext message 402 that was the original input to encryption operation 200 (if the output of encryption operation 200 is the input to decryption operation 300). A skilled person in the relevant art will appreciate that such data may be further processed once decryption operation 200 is complete, including storing said data or immediately presenting such to a user.

Figure 5:
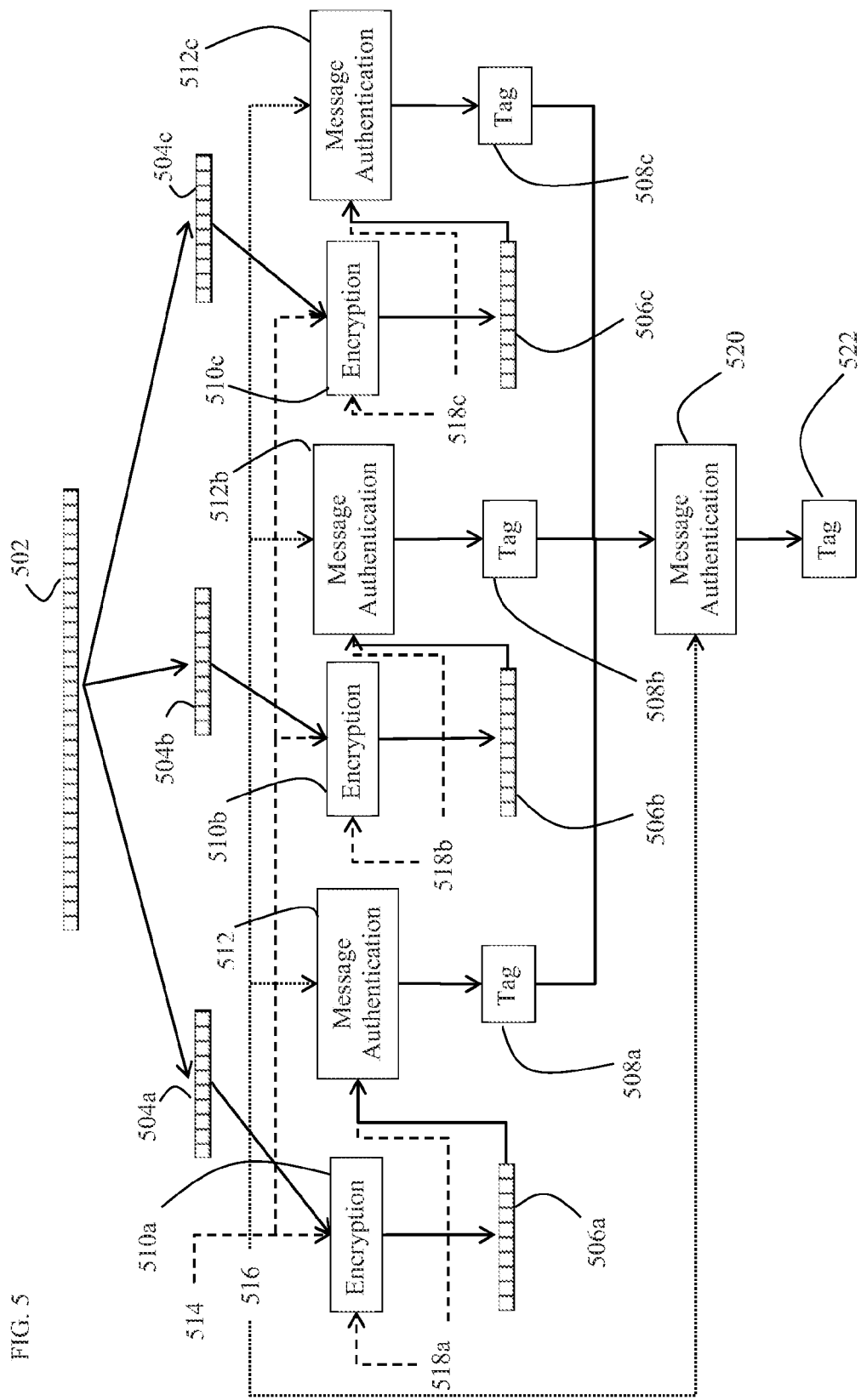
FIG. 5 is a block diagram depicting the encryption operation of FIG. 2 wherein message authentication is a function of a working block ciphertext.

FIG. 5 is a block diagram depicting encryption operation 200 in an alternative embodiment wherein message authentication tags are computed as a function of the working block ciphertext corresponding to a plaintext working block, instead of the plaintext working block itself.

In comparison to the embodiment illustrated by FIG. 4, steps 202 and 204 are completed in substantially the same manner in the present embodiment illustrated by FIG. 5. In particular, plaintext message 502 is divided into working blocks 504a, 504b, 504c and working block ciphertext 506a, 506b, 506c are computed, using encryption modules 510a, 510b, 510c as a function of such working blocks, encryption key 514, and initialization vectors 518a, 518b, 518c.

Step 206 comprises the illustrative distinction between the embodiments. In particular, whereas in the embodiment illustrated by FIG. 4 message authentication tags 408a, 408b, 408c are computed as a function of plaintext working blocks 404a, 404b, 404c, in the present embodiment illustrated by FIG. 5, message authentication tags 508a, 508b, 508c are computed, using message authentication modules 512a, 512b, 512c, as a function of working block ciphertext 506a, 506b, 506c. In both illustrative embodiments, such tags are also a function of message authentication keys 416, 516.

This distinction between the embodiments of encryption operation 200 illustrated by FIG. 4 and FIG. 5 gives rise to a further consequence. In particular, it is contemplated that a malicious third party may tamper with the communications between transmitting device 102 and receiving device 106 and swap or re-order the ciphertext working blocks (together with their associated message authentication tags). A method of detecting such is therefore illustratively desirable.

In the embodiment illustrated by FIG. 4 and FIG. 6, if, for example, a malicious third-party causes receiving device 106 to swap ciphertext working blocks 602a, 602b (and their associated message authentication tags), such swapping is inherently detectable. In particular, since working block initialization vectors 618a and 618b are different (as described in greater detail above), decrypting ciphertext working block 602a (that would be more properly 602b absent said malicious swapping) using working block initialization vector 618a gives rise to plaintext working block 606a that is incorrect, and accordingly, message authentication tag 610a calculated from plaintext working block 606a will not match the corresponding message authentication tag received by receiving device 106. Similarly, decrypting ciphertext working block 602b (that is more properly 602a absent said malicious swapping) using working block initialization vector 618b gives rise to plaintext working block 606b that is incorrect, and accordingly, message authentication tag 610b calculated from plaintext working block 606b will not match the corresponding message authentication tag received by receiving device 106.

Figure 7:
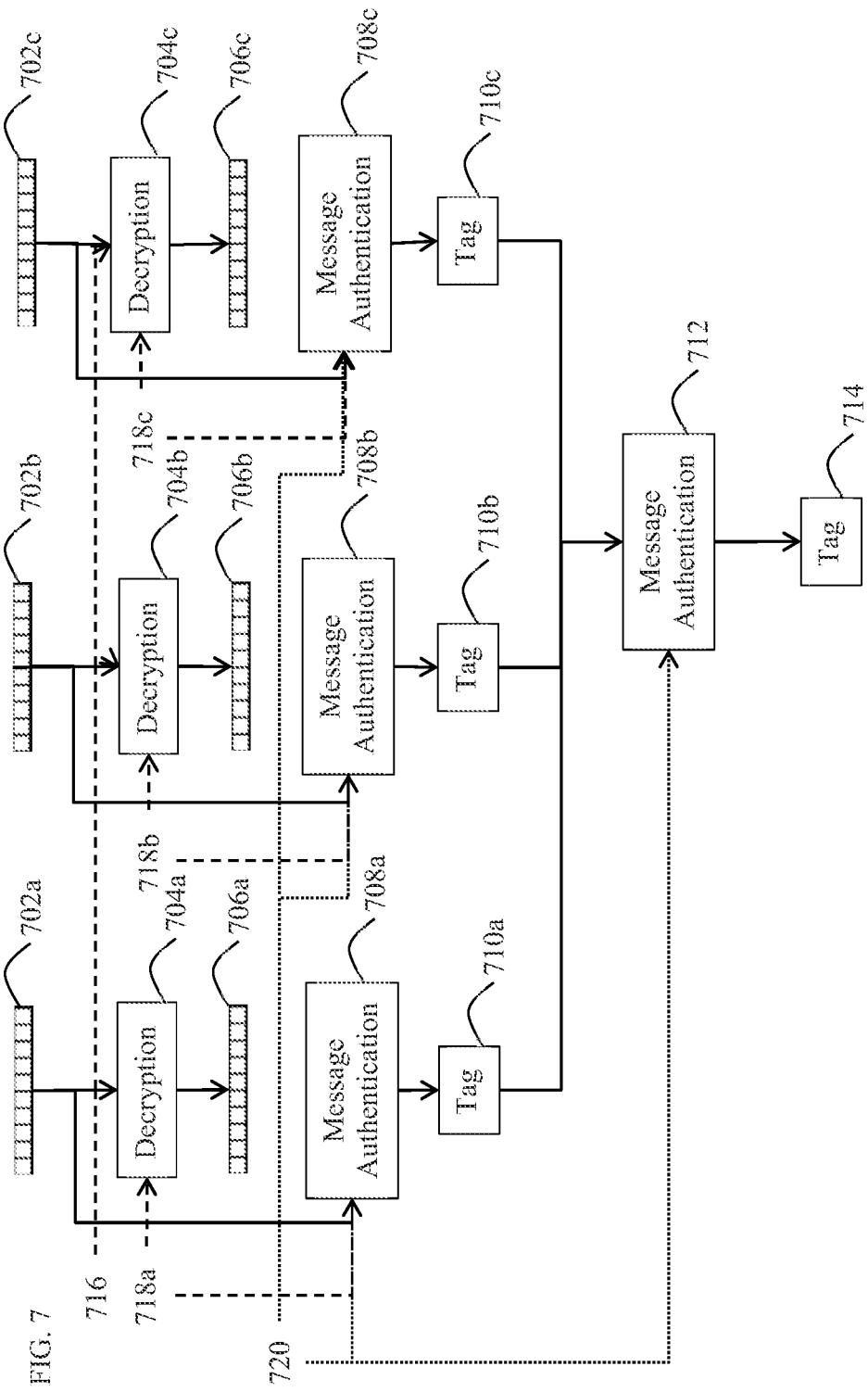
FIG. 7 is a block diagram depicting the decryption operation of FIG. 3 wherein message authentication is a function of a working block ciphertext.

However, in the embodiment illustrated by FIG. 5 and FIG. 7, if, for example, a malicious third-party causes receiving device 106 to swap ciphertext working blocks 602a, 602b (and their associated message authentication tags), a further element is illustratively included in order to detect such swapping. In particular, where the message authentication tag is computed on the ciphertext (as in this embodiment), such message authentication tag should also be a function of an implied or express indication corresponding to the mathematical relationship of the plaintext working block to the plaintext message more generally. Put another way, where the message authentication tag is computed on the plaintext (as in the previous embodiment), such message authentication tag is implicitly a function of such indication (since the computation of a plaintext message from a particular working block ciphertext already depends upon a unique initialization vector that corresponds to the mathematical relationship of the plaintext working block to the overall message), but where the message authentication tag is computed on the ciphertext, such tag can illustratively have such an indication expressly added.

For example, in the illustrative embodiment wherein plaintext message 502 is partitioned into, among other things, plaintext working block 504a, and working block ciphertext 506a is computed from plaintext working block 504a, one option for computing message authentication tag 508a as a function of, among other things, an indication of the mathematical relationship of plaintext working block 504a to plaintext message 502, is to compute message authentication tag 508a as a function of initialization vector 518a (as depicted illustratively in FIG. 5), among other things. In other illustrative embodiments, message authentication tag 508a may be merely a function of the position of plaintext working block 504a within plaintext message 502. This may be accomplished by, for example, computing message authentication tag 508a as a function of, among other things, the index of plaintext working block 504a within plaintext message 502 (e.g. plaintext working blocks 504a, 504b, 504c having indices 0, 1, and 2, respectively). In still other illustrative embodiments, the message authentication keys (also sometimes known as subkeys) may be generated from an initial value (i.e. a global key) and a suitable increment function (as described above), such generated message authentication keys thus providing an indication corresponding to the mathematical relationship of the plaintext working block to the plaintext message more generally.

Lastly, in comparison to the embodiment illustrated by FIG. 4, step 210 is completed in substantially the same manner in the present embodiment illustrated by FIG. 5. In particular, transmitting device 102 computes a global message authentication tag 522 as a function of the message authentication tag of each individual working block (i.e. message authentication tags 508a, 508b, 508c) as well as message authentication key 516. The other illustrative embodiments described above similarly apply. For example, an accumulator may be computed as a function of the message authentication tag of each individual working block, and global message authentication tag 522 may also be a function of the total length of the plaintext working blocks.

The alternative embodiment of encryption operation 200 described above also illustrates a further alternative embodiment wherein there is no encryption and only message authentication, thereby comprising a method of producing message authentication information. Illustratively, such embodiment substantially corresponds to the above described alternative embodiment of encryption operation 200 wherein step 204 is the application of an identity function (instead of a cipher) to working blocks 504a, 504b, 504c to produce working block ciphertext 506a, 506b, 506c. That is, encryption modules 510a, 510b, 510c do not encrypt, per se, but rather, cause working block ciphertext 506a, 506b, 506c to be identical to working blocks 504a, 504b, 504c. A skilled person in the relevant art will appreciate that such use of an identity function in lieu of use of an encryption method is for the purpose of illustration, and the above message authentication method may be implemented to avoid such step altogether. Such person will further appreciate that other aspects of the above described method should be modified or not used or performed in this alternative embodiment. For example, there is no use of encryption key 514 by encryption modules 510a, 510b, 510c, and for each working block, the method may comprise only computing a message authentication tag.

FIG. 7 is a block diagram depicting corresponding decryption operation 300 in such alternative embodiment of encryption operation 200 illustrated by FIG. 5. A person of skill in the relevant art will appreciate that decryption operation 300 must operate in a corresponding fashion to encryption operation 200, as described in greater detail herein.

Step 302 operates in substantially the same manner in this illustrative embodiment as in the alternative embodiment illustrated by FIG. 6 and described above. In particular, for ciphertext working blocks 702a, 702b, 702c, this input is decrypted using decryption modules 704a, 704b, 704c to form plaintext working blocks 706a, 706b, 706c as a function of initialization vectors 718a, 718b, 718c and decryption key 716.

Step 304 comprises the illustrative distinction between the embodiments. In particular, whereas in the embodiment illustrated by FIG. 6 message authentication tags 610a, 610b, 610c are computed as a function of plaintext working blocks 606a, 606b, 606c, in the present embodiment illustrated by FIG. 7, message authentication tags 710a, 710b, 710c are computed, using message authentication modules 708a, 708b, 708c as a function of ciphertext working blocks 702a, 702b, 702c (and in both cases, further as a function of message authentication keys 620, 720, respectively).

As described above, this distinction in the computation of message authentication tags gives rise, in the context of encryption operation 200, to a potential need to compute message authentication tags 508a, 508b, 508c also as a function of an indication corresponding to the mathematical relationship of the plaintext working block (i.e. plaintext working blocks 504a, 504b, 504c) to the plaintext message (i.e. plaintext message 502) more generally. As message authentication tags 710a, 710b, 710c should be computed in a manner that corresponds to message authentication tags 508a, 508b, 508c, message authentication tags 710, 710b, 710c may also be a function of such indication.

For example, if message authentication tag 508a is also a function of initialization vector 518a (as depicted illustratively in FIG. 5), then message authentication tag 710a should also be a function of initialization vector 718a (as depicted illustratively in FIG. 7). Alternatively, if message authentication tag 508a is a function of the position of plaintext working block 504a within plaintext message 502 (for example, by such tag being a function of the index of the plaintext working block 504a within plaintext message 502), then message authentication tag 710a should also be a function of such position by, for example, by being a function of such index.

Steps 306, 308, 310 and 312 otherwise operate in substantially the same manner in this embodiment illustrated by FIG. 7, as in the illustrative embodiment depicted by FIG. 6. In particular, message authentication tags 710a, 710b, 710c are compared against the corresponding message authentication tags received by receiving device 106 to identify potential message integrity issues, a global message authentication tag 714 is calculated using message authentication module 712 and as a function of, among other things, message authentication tags 710a, 710b, 710c and message authentication key 720, and the computed global message authentication tag 714 is compared against a corresponding global message authentication tag received by receiving device 106 to identify further message integrity issues.

Decryption operation 200 may also be modified to correspond to the above-described alternative embodiment of encryption operation 200 comprising a method of message authentication, thereby comprising a method of determining the authenticity of a received message. In particular, step 302 comprises converting ciphertext working blocks 702a, 702b, 702c into plaintext working blocks 706a, 706b, 706c by means of an identity function; that is, decryption modules 704a, 704b, 704c do no decrypt, per se, but rather, cause plaintext working blocks 706a, 706b, 706c to be identical to ciphertext working blocks 702a, 702b, 702c. A skilled person in the relevant art will again appreciate that the above described use of an identity function in lieu of a decryption step is for the purpose of illustration, and the above message authentication method may be implemented to avoid such step altogether. Such person will further appreciate that other aspects of the above described method should be modified or not used or performed in this alternative embodiment. For example, there is no use of decryption key 716 by decryption modules 704a, 704b, 704c and for each working block, the method may comprise only computing a message authentication tag.

For greater certainty, the steps illustrated by encryption operation 200 and decryption operation 300 may be performed in a different order than as depicted and as will be appreciated by a skilled person in the relevant art. For example, in the illustrative embodiment of the present disclosure depicted by FIG. 4, steps 204 and 206 may be performed in the reverse order as working block message authentication tags (e.g. tags 408a, 408b, 408c) are computed to be a function of plaintext working blocks (e.g. plaintext working blocks 404a, 404b, 404c) and therefore do not require that the ciphertext be first computed. Similarly, in the illustrative embodiment of the present disclosure depicted by FIG. 7, steps 302 and 304 may be performed in the reverse order as working block message authentication tags (e.g. tags 710a, 710b, 710c) are computed to be a function of ciphertext working blocks (e.g. ciphertext working blocks 702a, 702b, 702c) and therefore do not require that the plaintext be first computed.

In alternative embodiments, it may be sometimes desirable to modify plaintext messages (e.g. plaintext message 402) following a first application of encryption operation 200 and to repeat encryption operation 200 in respect of the modified message.

One exemplary approach is to repeat encryption operation 200 in full using the modified plaintext message (i.e. repeat steps 202 to 210).

Alternatively, an update operation may be performed in certain circumstances such as if plaintext message 402 is modified so that only some working blocks derived therefrom (at step 202) are modified or otherwise affected. In such operation, the working block specific steps (i.e. steps 204 and 206) are only performed in respect of the affected working blocks (thereby potentially having the effect of reducing computation, storage, and transmission demands).

For example, if plaintext message 402 is modified so that (a) working blocks 404a and 404c are not affected (e.g. they are identical to the corresponding working blocks produced from original plaintext message 402) and (b) working block 404b is affected (e.g. it is modified relative to the corresponding working block produced from original plaintext message 402), then steps 204 and 206 may be avoided for working blocks 404a and 404c, and steps 204 and 206 need to be performed only for affected working block 404b.

This update operation may also comprise recomputing global message authentication tag 422. In one embodiment, step 210 may be repeated to compute global message authentication tag 422 as a function of the message authentication tag of each individual plaintext working block (or its ciphertext), as modified or recomputed, as well as message authentication key 416. Alternatively, in embodiments wherein it is possible to incrementally negate or add the effect of one or more working block message authentication tags on computed global message authentication tag 422, a new global message authentication tag may be computed by incrementally negating the effect of the original message authentication tags corresponding to the affected plaintext working blocks (or their corresponding ciphertext), and adding the effect of the newly computed message authentication tags corresponding to the affected plaintext working blocks (or their corresponding ciphertext).

Continuing the above example wherein steps 204 and 206 are performed only for affected working block 404b, if global message authentication tag 422 comprises the message authentication tags for each individual plaintext working block accumulated using the XOR operation (as described above), new global message authentication tag 422 can be computed as original global message authentication tag 422 XOR original tag 408b (calculated from original working block 404b) XOR new tag 408b (calculated from modified working block 404b). In effect, this computation negates the effect of the message authentication tag corresponding to the now modified plaintext working block, and adds the effect of the message authentication tag corresponding to the modified plaintext working block. This computation may use stored or cached original tag 408b, or recalculate this value based on original working block 404b.

A skilled person in the art will appreciate that there are certain limitations to the update operation described above. For instance, whether the modifications to the plaintext message affects the size of the working blocks may be relevant. Continuing the above example wherein only working block 404b is modified (and working blocks 404a and 404c remain as is), if working block 404b is also a different size, this change in size may, in certain embodiments, affect the output of the encryption and message authentication steps in relation to working blocks 404a and 404c. If so, working blocks 404a and 404c are also affected by the modification to the plaintext message, and steps 204 and 206 need to be repeated for these working blocks as well, even though they are otherwise not modified. In contrast, if encryption and message authentication modules are selected and configured such that a change in the size of a given working block does not affect their output in respect of other working blocks, then steps 204 and 206 may not need to be repeated for such other working blocks (i.e. working blocks 404a and 404c are not affected by the modification to the plaintext message).

An exemplary embodiment is the application of the aforedescribed encryption and update operations in the context of the sector-level encryption and remote backup of a computer hard drive. For example, if the computer hard drive is configured to have 64 kilobyte sectors, encryption operation 200 may be configured to have 64 kilobyte working blocks as well. At a first point in time, the whole of the computer hard drive may be encrypted and transmitted to a remote backup server, along with message authentication information, as described herein. Assuming there is continued use of the computer hard drive, an update operation may be periodically executed so as to maintain the currency of the remote backup. That is, at some future point in time, the computer hard drive may be analyzed to determine which sectors have been modified since the first point in time, and those specific sectors (corresponding to individual working blocks) may be encrypted and transmitted to the remote backup server, along with message authentication information (i.e. an updated global message authentication tag and optional working block specific message authentication tags). Particularly in situations wherein only a small proportion of the sectors of the computer hard drive have been modified, the aforedescribed update operation potentially reduces the amount of encryption that must be performed, and the amount of data that must be transmitted to the remote backup server.

All publications and patent applications mentioned in this specification are herein incorporated by reference to the same extent as if each individual publication or patent application was specifically and individually incorporated by reference.

While the foregoing disclosure has been described in some detail for purposes of clarity and understanding, it will be appreciated by one skilled in the art, from a reading of the disclosure, that various changes in form and detail can be made without departing from the true scope of the disclosure.

What is claimed is:

1. A computer-implemented authenticated encryption method for converting a plaintext message into a ciphertext message, said method comprising:
    dividing said plaintext message into at least two working blocks, each respective working block of said at least two working blocks having a mathematical relationship to said plaintext message;
    for each respective working block of said at least two working blocks:
    computing a working block ciphertext by using direct inputs that include said respective working block, a deterministic working block initialization vector, and a deterministic working block encryption key, wherein the deterministic working block initialization vector is a function of a global initialization vector; and
    computing a message authentication tag for said respective working block by using direct inputs that include a deterministic working block message authentication key, the working block ciphertext computed for said respective working block, and said deterministic working block initialization vector used to compute said respective working block ciphertext for said respective working block, wherein the deterministic working block message authentication key is a global message authentication key;
    and wherein the message authentication tag for said respective working block is computed based on an indication corresponding to said mathematical relationship of said respective working block to said plaintext message, wherein the indication indicates a position of said respective working block within said plaintext message;
    computing a global message authentication tag as a function of the message authentication tag computed for each respective working block of said at least two working blocks, said global initialization vector, and the global message authentication key, and as a function of a length of each respective working block of said at least two working blocks; and
    transmitting, to a receiving device, said ciphertext message, wherein said ciphertext message comprises the working block ciphertext computed for each respective working block of said at least two working blocks and said global message authentication tag, and said global message authentication tag is used to authenticate the working block ciphertext for each respective working block of said at least two working blocks.

2. The method of claim 1 wherein said ciphertext message further comprises the message authentication tag computed for each respective working block of said at least two working blocks.

3. The method of claim 2 wherein said dividing said plaintext message into at least two working blocks comprises partitioning said plaintext message into at least two working blocks.

4. The method of claim 1 wherein, for each respective working block of said at least two working blocks, the deterministic working block encryption key used to compute the working block ciphertext computed for said respective working block is a single encryption key common to said at least two working blocks.

5. The method of claim 1 wherein, for each respective working block of said at least two working blocks, said computing a message authentication tag for respective working block comprises computing a function of a deterministic working block message authentication key and said respective working block.

6. The method of claim 1 wherein, for each respective working block of said at least two working blocks, said computing a message authentication tag for respective working block comprises computing a function of a deterministic working block message authentication key, the working block ciphertext computed for respective working block, and at least one of (a) the deterministic working block initialization vector used to compute the working block ciphertext computed for respective working block and (b) the indication corresponding to the position of respective working block within said plaintext message.

7. The method of claim 4 wherein, for each respective working block of said at least two said working blocks, the deterministic working block message authentication key used to compute the message authentication tag for said respective working block is a function of an initial value and the indication corresponding to the position of respective working block within said plaintext message; wherein, for each respective working block of said at least two said working blocks, said computing a message authentication tag for said respective working block comprises computing a function of a deterministic working block message authentication key and the working block ciphertext computed for said respective working block.

8. A computer-implemented method for converting at least two ciphertext working blocks into a plaintext message, said at least two ciphertext working blocks associated with a global message authentication tag, said method comprising:
receiving said global message authentication tag;
for each respective ciphertext working block of said at least two ciphertext working blocks:
computing a plaintext working block by using direct inputs that include said respective ciphertext working block, a deterministic working block initialization vector, and a deterministic working block decryption key, wherein the deterministic working block initialization vector is a function of a global initialization vector;
computing a message authentication tag for said respective ciphertext working block by using direct inputs that include a deterministic working block message authentication key, said respective ciphertext working block, said deterministic working block initialization vector used to compute said respective plaintext working block for said respective ciphertext working block, wherein the deterministic working block message authentication key is a global message authentication key;
and wherein the message authentication tag for said respective ciphertext working block is computed based on an indication corresponding to a mathematical relationship of said respective ciphertext working block to said plaintext message, wherein the indication indicates a position of said respective working block within said plaintext message;
computing a global message authentication tag as a function of the message authentication tag computed for each respective ciphertext working block of said at least two ciphertext working blocks, said global initialization vector, and the global message authentication key, and as a function of a length of the plaintext working block computed for each respective ciphertext working block of said at least two ciphertext working blocks;
comparing said computed global message authentication tag with said global message authentication tag associated with said at least two ciphertext working blocks;
determining whether said at least two ciphertext working blocks are authenticated based on the comparing of said computed global message authentication tag with said global message authentication tag; and
wherein said plaintext message comprises the plaintext working block computed for each respective ciphertext working block said at least two ciphertext working blocks.

9. The method of claim 8 wherein each respective ciphertext working block of said at least two ciphertext working blocks is associated with a message authentication tag and wherein said method further comprises, for each respective ciphertext working block of said at least two ciphertext working blocks, comparing the message authentication tag computed for said respective ciphertext working block with said message authentication tag associated with said respective ciphertext working block.

10. The method of claim 9 wherein said plaintext message comprises a concatenation of the plaintext working block computed for each respective ciphertext working block of said at least two ciphertext working blocks.

11. The method of claim 8 wherein, for each respective ciphertext working block of said at least two ciphertext working blocks, the deterministic working block decryption key used to compute the plaintext working block for said respective ciphertext working block is a single decryption key common to said at least two ciphertext working blocks.

12. The method of claim 8 wherein, for each respective ciphertext working block of said at least two ciphertext working blocks, said computing a message authentication tag comprises computing a function of a deterministic working block message authentication key and the plaintext working block computed for respective ciphertext working block.

13. The method of claim 8 wherein, for each respective ciphertext working block of said at least two ciphertext working blocks, said computing a message authentication tag comprises computing a function of a deterministic working block message authentication key, said respective ciphertext working block, and at least one of (a) the deterministic working block initialization vector used to compute the plaintext working block for said respective ciphertext working block and (b) the indication corresponding to the position of the plaintext working block computed for said respective ciphertext working block within said plaintext message.

14. The method of claim 11 wherein, for each respective ciphertext working block of said at least two ciphertext working blocks, the deterministic working block message authentication key used to compute the message authentication tag for said respective ciphertext working block is a function of an initial value and the indication corresponding to the position of the plaintext working block computed for said respective ciphertext working block within said plaintext message; wherein, for each respective ciphertext working block of said at least two ciphertext working blocks, said computing a message authentication tag for said respective ciphertext working block comprises computing a function of a deterministic working block message authentication key and said respective ciphertext working block.

15. The method of claim 1, said method further comprising:
providing an updated plaintext message that is an update to said plaintext message;
dividing said updated plaintext message into at least two updated working blocks, each respective working block of said at least two updated working blocks having a mathematical relationship to said updated plaintext message and corresponding to one of said at least two working blocks;

identifying at least one updated working block that is affected by said update to said plaintext message;

for each respective identified working block of said at least two identified updated working blocks:

computing an updated working block ciphertext as a function of said respective identified updated working block, a deterministic working block initialization vector, and a deterministic working block encryption key;

computing an updated message authentication tag as a function of a deterministic working block message authentication key and the updated working block ciphertext computed for said respective identified updated working block and an indication corresponding to said mathematical relationship of said respective identified updated working block to said updated plaintext message;

computing an updated global message authentication tag as a function of said global message authentication tag, the updated message authentication tag computed for each respective identified updated working block, the message authentication tag computed for the working block corresponding to each respective identified updated working block, and said global message authentication key; and wherein an updated ciphertext message comprises the working block ciphertext computed for each respective working block of said at least two working blocks not identified, if any, the updated working block ciphertext computed for each respective identified updated working block, and said updated global message authentication tag.

16. A non-transitory computer readable memory storing computer executable instructions thereon that when executed by a computer performs a method of authenticated encryption method for converting a plaintext message into a ciphertext message, said method comprising:

dividing said plaintext message into at least two working blocks, each respective working block of said at least two working blocks having a mathematical relationship to said plaintext message;

for each respective working block of said at least two working blocks:

computing a working block ciphertext by using direct inputs that include said respective working block, a deterministic working block initialization vector, and a deterministic working block encryption key, wherein the deterministic working block initialization vector is a function of a global initialization vector; and computing a message authentication tag by using direct inputs that include a deterministic working block message authentication key, the working block ciphertext computed for said respective working block, said deterministic working block initialization vector used to compute said working block ciphertext for said respective working block, wherein the deterministic working block message authentication key is a global message authentication key;

and wherein the message authentication tag is computed based on an indication corresponding to said mathematical relationship of said respective working block to said plaintext message, wherein the indication indicates a position of said respective working block within said plaintext message;

computing a global message authentication tag as a function of the message authentication tag computed for each respective working block of said at least two working blocks and a global message authentication key, said global initialization vector, and the global message authentication key, and as a function of a length of each respective working block of said at least two working blocks; and transmitting, to a receiving device, said ciphertext message, wherein said ciphertext message comprises the working block ciphertext computed for each respective working block of said at least two working blocks and said global message authentication tag, and said global message authentication tag is used to authenticate the working block ciphertext for each respective working block of said at least two working blocks.

17. A non-transitory computer readable memory storing computer executable instructions thereon that when executed by a computer performs a method for converting at least two ciphertext working blocks into a plaintext message, said at least two ciphertext working blocks associated with a global message authentication tag, said method comprising:

receiving said global message authentication tag;

for each respective ciphertext working block of said at least two ciphertext working blocks:

computing a plaintext working block by using direct inputs that include said respective ciphertext working block, a deterministic working block initialization vector, and a deterministic working block decryption key, wherein the deterministic working block initialization vector is a function of a global initialization vector;

computing a message authentication tag by using direct inputs that include a deterministic working block message authentication key, said respective ciphertext working block, said deterministic working block initialization vector used to compute said plaintext working block for said respective ciphertext working block, wherein the deterministic working block message authentication key is a global message authentication key;

and wherein the message authentication tag is computed based on an indication corresponding to a mathematical relationship of said respective ciphertext working block to said plaintext message, wherein the indication indicates a position of said respective working block within said plaintext message;

computing a global message authentication tag as a function of the message authentication tag computed for each respective ciphertext working block of said at least two ciphertext working blocks, said global initialization vector, and the global message authentication key, and as a function of a length of the plaintext working block computed for each respective ciphertext working block of said at least two ciphertext working blocks;

comparing said computed global message authentication tag with said global message authentication tag associated with said at least two ciphertext working blocks;

determining whether said at least two ciphertext working blocks are authenticated based on the comparing of said computed global message authentication tag with said global message authentication tag; and wherein said plaintext message comprises the plaintext working block computed for each respective ciphertext working block said at least two ciphertext working blocks.

* * * * *